United States Patent [19]

Bjornard et al.

[11] Patent Number: 5,407,733
[45] Date of Patent: Apr. 18, 1995

[54] ELECTRICALLY-CONDUCTIVE, LIGHT-ATTENUATING ANTIREFLECTION COATING

[75] Inventors: Erik J. Bjornard, Northfield; Debra Steffenhagen, Faribault, both of Minn.; R. Russel Austin, Novato, Calif.

[73] Assignee: Viratec Thin Films, Inc., Faribault, Minn.

[21] Appl. No.: 753,714

[22] Filed: Sep. 3, 1991

Related U.S. Application Data

[63] Continuation-in-part of Ser. No. 566,052, Aug. 10, 1990, Pat. No. 5,091,244.

[51] Int. Cl.$^6$ .............................................. B32B 9/00
[52] U.S. Cl. ...................................... 428/216; 428/212; 428/432; 428/698; 428/699; 428/701; 359/359; 359/580; 359/586; 359/589
[58] Field of Search ............... 428/698, 699, 701, 432, 428/216, 212; 359/359, 580, 586, 589

[56] References Cited

U.S. PATENT DOCUMENTS

| | | | |
|---|---|---|---|
| 3,761,160 | 9/1973 | Apfel et al. | 350/164 |
| 3,829,197 | 8/1974 | Thelen | 350/164 |
| 3,854,796 | 12/1974 | Thelen | 350/164 |
| 3,858,965 | 1/1975 | Sumita | 350/164 |
| 3,885,855 | 5/1975 | Gross | 428/432 |
| 3,922,068 | 11/1975 | Netsuki | 350/166 |
| 4,308,316 | 12/1981 | Gordon | 328/336 |
| 4,387,960 | 6/1983 | Tani | 350/164 |
| 4,422,721 | 12/1983 | Hahn et al. | 350/164 |
| 4,534,841 | 8/1985 | Hartig et al. | 428/426 |
| 4,535,000 | 8/1985 | Gordon | 427/166 |
| 4,628,005 | 12/1986 | Ito et al. | 428/432 |
| 4,690,871 | 9/1987 | Gordon | 428/432 |
| 4,732,454 | 3/1988 | Saito et al. | 359/359 |
| 4,799,745 | 1/1989 | Meyer et al. | 359/580 |
| 4,805,989 | 2/1989 | Nakajima | 350/164 |
| 4,847,157 | 7/1989 | Goodman et al. | 428/426 |

FOREIGN PATENT DOCUMENTS

| | | |
|---|---|---|
| 203903A | 11/1983 | German Dem. Rep. . |
| 204693 | 12/1983 | German Dem. Rep. . |
| 209176A | 4/1984 | German Dem. Rep. . |
| 225860A | 8/1985 | German Dem. Rep. . |
| 3627248 | 4/1987 | Germany . |
| 3941797 | 6/1991 | Germany . |
| 63-206333 | 8/1988 | Japan . |
| 242948 | 10/1988 | Japan . |
| 1397316 | 6/1975 | United Kingdom . |
| 1406567 | 9/1975 | United Kingdom . |
| 1417779 | 12/1975 | United Kingdom . |

OTHER PUBLICATIONS

"Selective Transmission of Thin TiN-films", E. Valkonen, et al., Dept of Solid State Physics, Inst. of Tech., Uppsala University, Sweden (Proc. SPIE Int. Soc. Opt. Eng., vol. 401, pp. 375–381 (1983).

Chemical Abstracts, vol. 101, No. 26, Dec. 1984, Columbus, Ohio, Abstract No. 234577z, p. 243.

"Optical and Electrical Properties of Thin TiN Layers", V. Szczyrbowski, et al., Vakuum Technik, vol. 37, pp. 14–19, Jan. 14, 1988.

"Optical Constants of Thin Silver and Titanium Nitride Films", E. Vakonen et al., Inst. of Tech. Uppsala University, Uppsala, Sweden (Proc. SPIE Int. Soc. Opt. Eng. (USA)), vol. 652, pp. 235–242.

"A New Approach to the Design of Metal-Dielectric Thin-Film Antireflection Coatings", H. A. MacLeod (Optica. Acta, 1978, vol. 25, No. 2, pp. 93–106).

"Reflectivity of ScN$_x$ Thin Films: Comparison with TiN$_x$ TiN$_x$C$_x$ and ZrN$_x$ Coatings and Application to the Photothermal Conversion of Solar Energy", Francois, J. C. et al. (Thin Solid Films, 127 (1985), 205–214, Electronics and Optics).

Primary Examiner—A. A. Turner
Attorney, Agent, or Firm—Heller, Ehrman, White & McAuliffe

[57] ABSTRACT

A coating for an article comprising layers of nitrides of certain transition metals to provide an electrically-conductive, light-attenuating, antireflection surface.

20 Claims, 14 Drawing Sheets

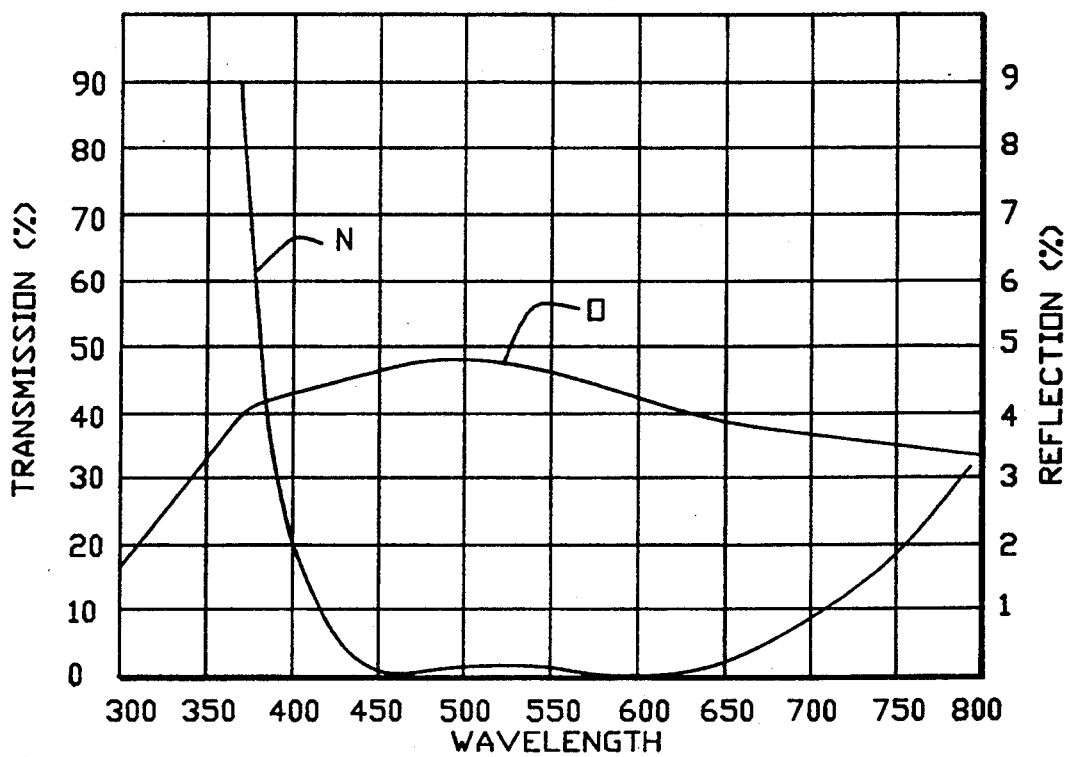
FIG.—8
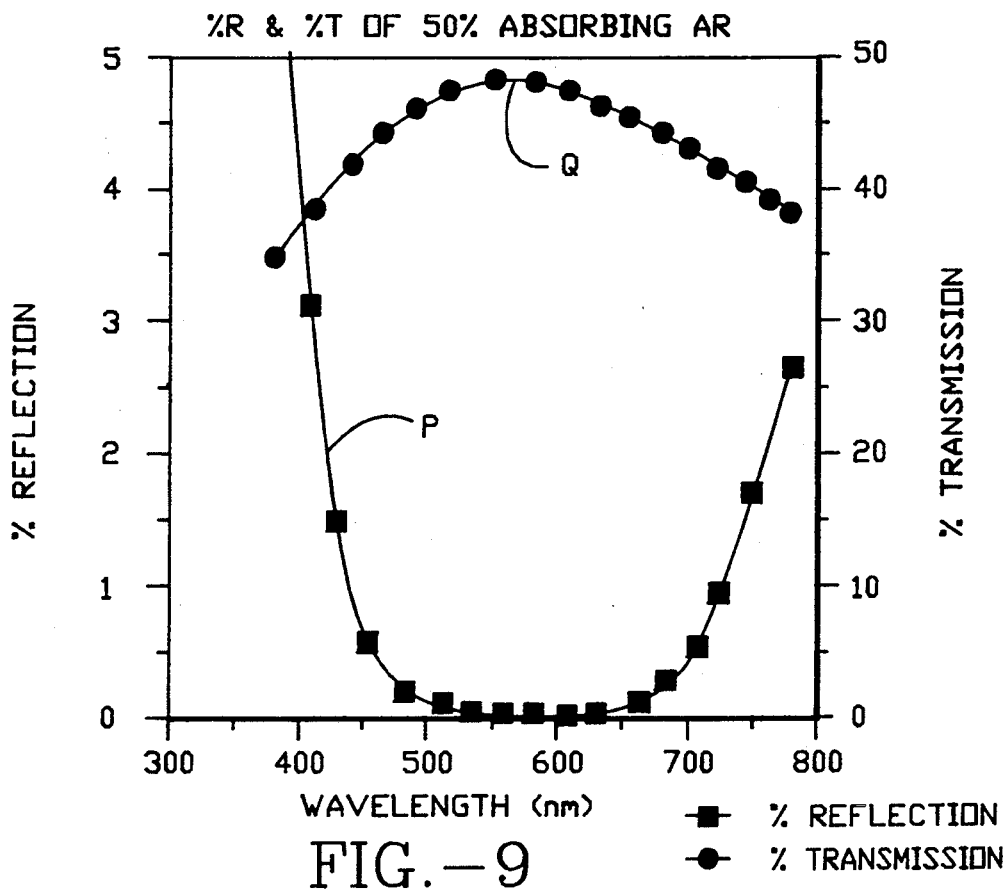
FIG.—9

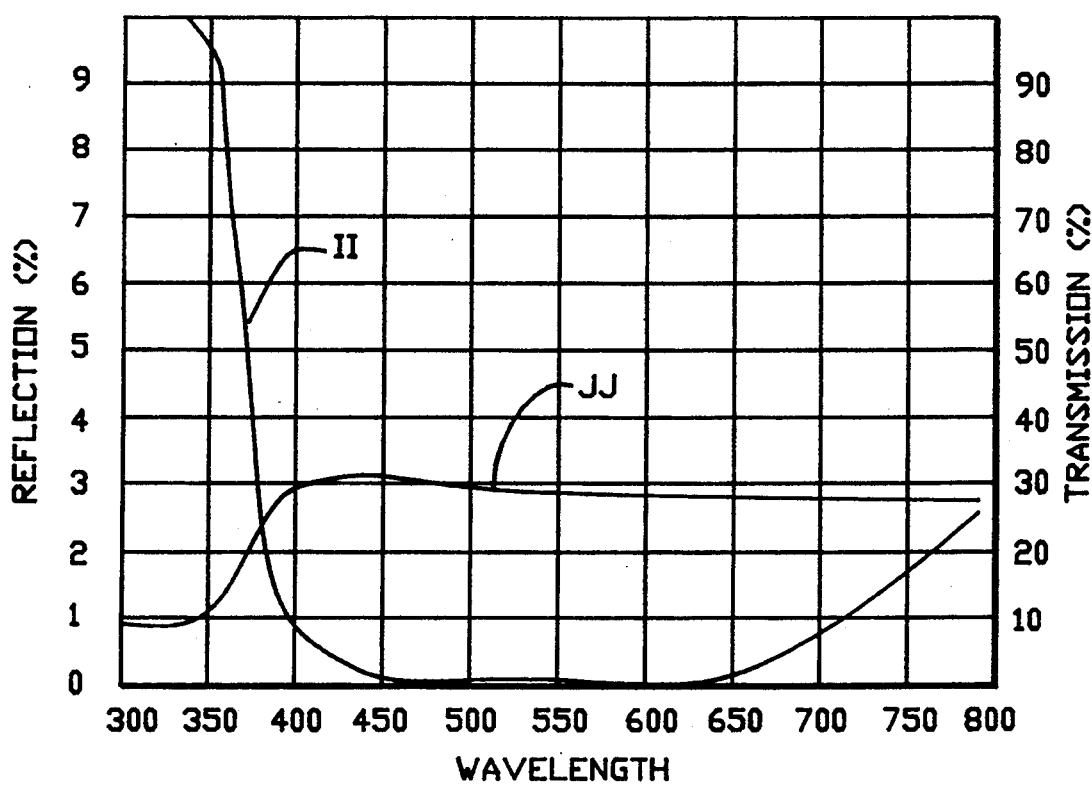
FIG.—14
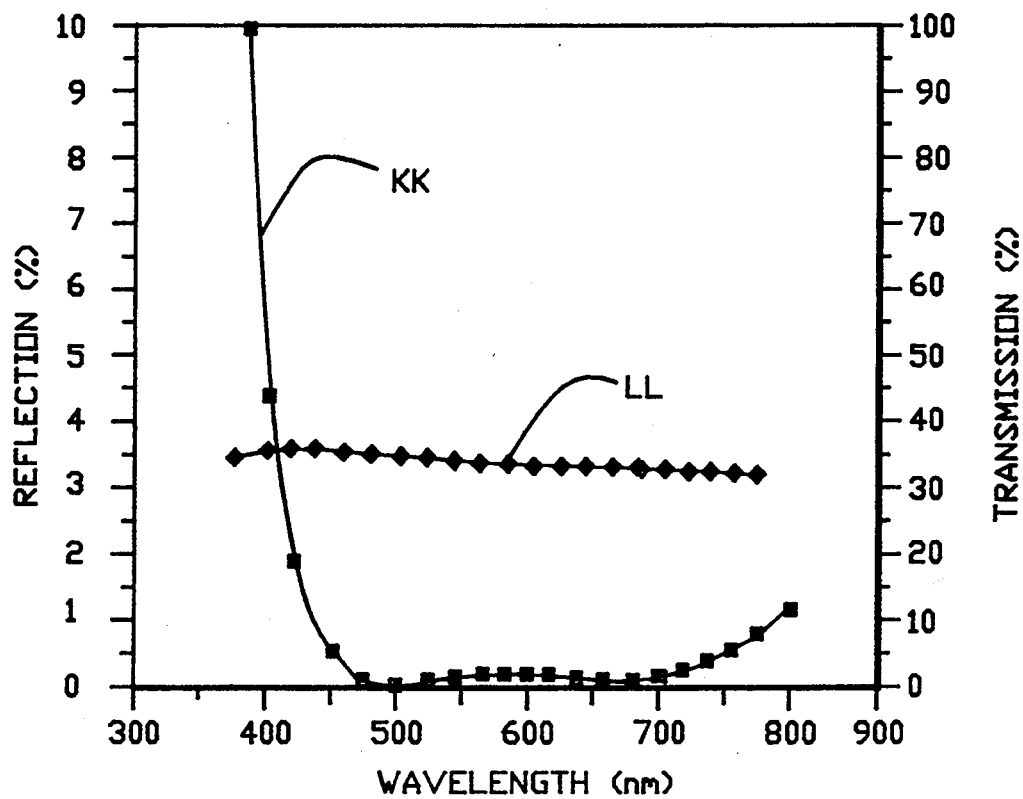
FIG.—15

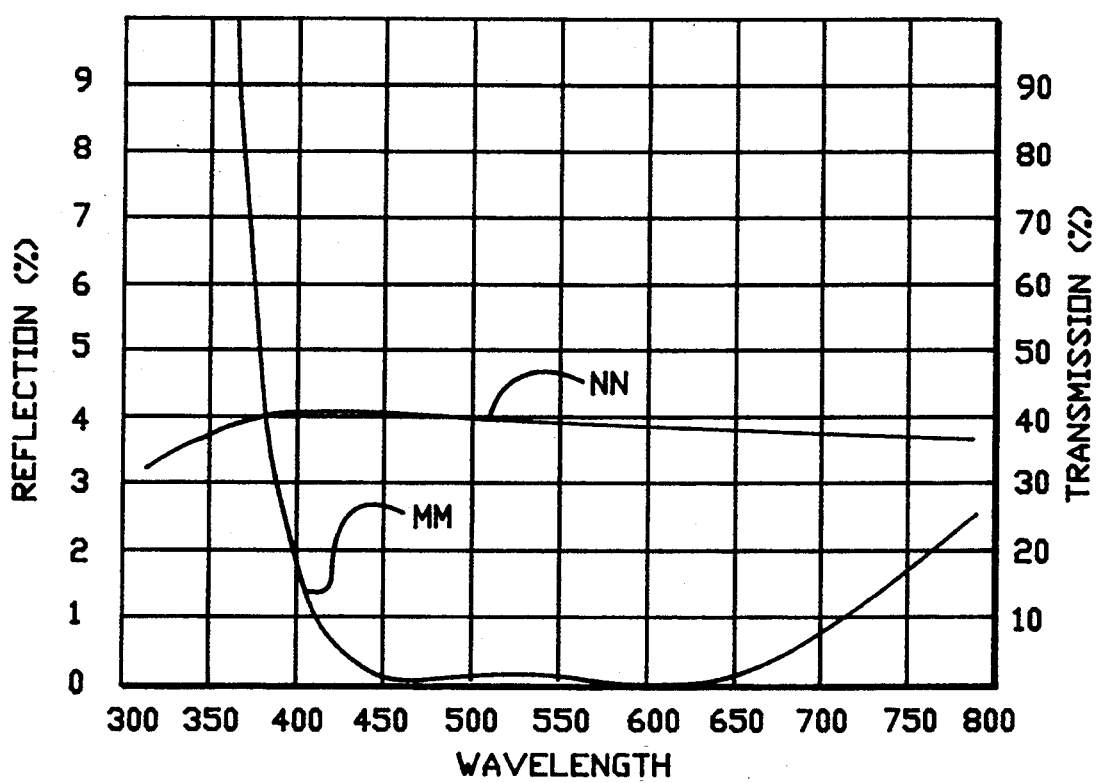
FIG.—16
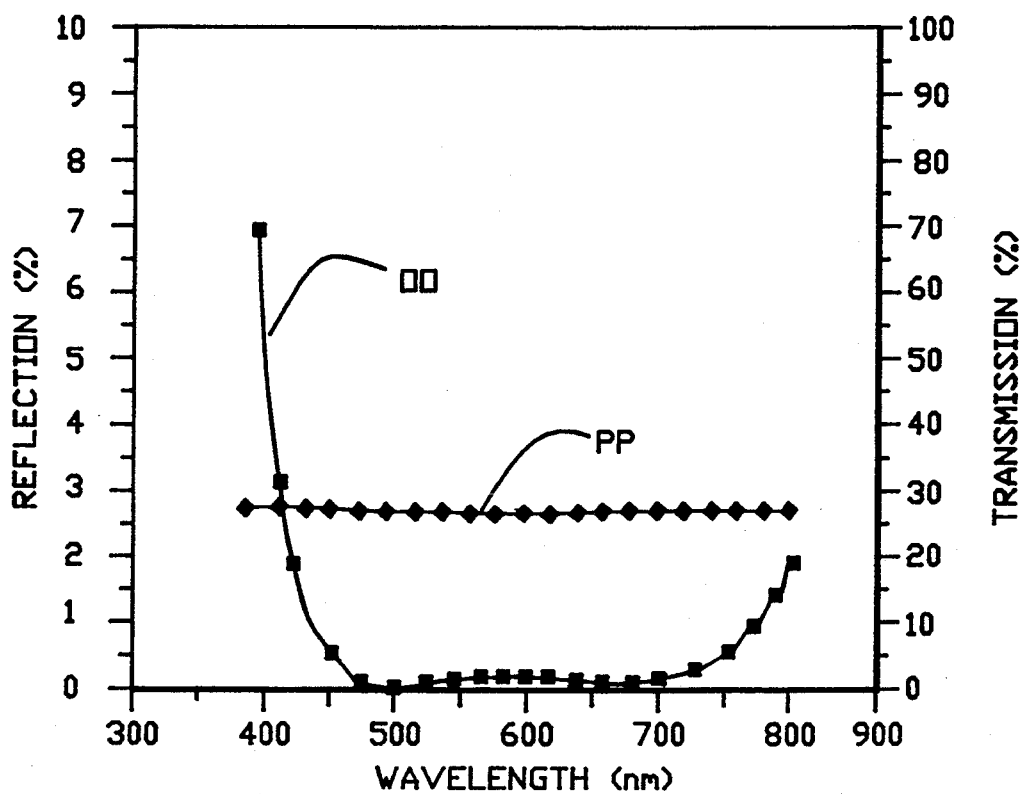
FIG.—17

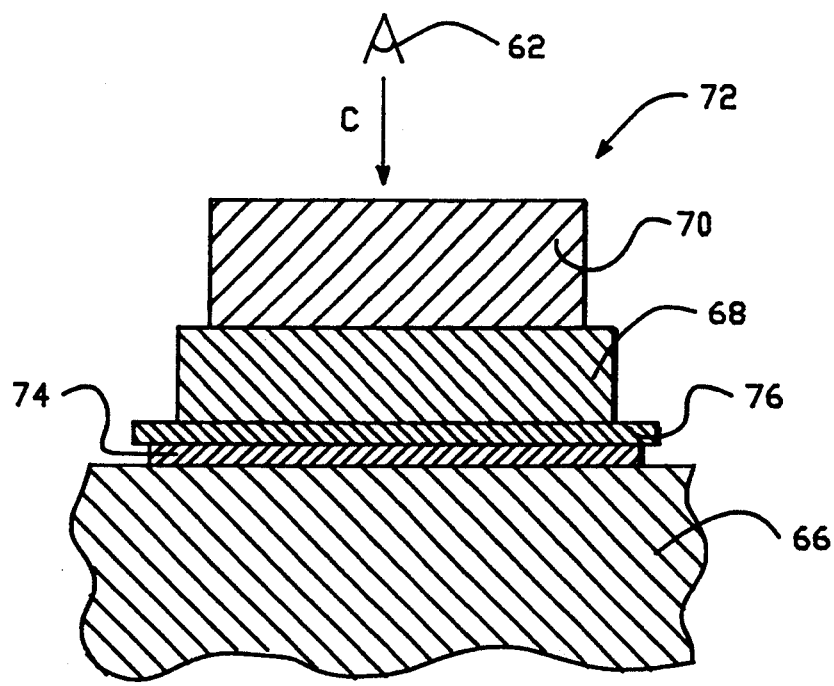
FIG.—21
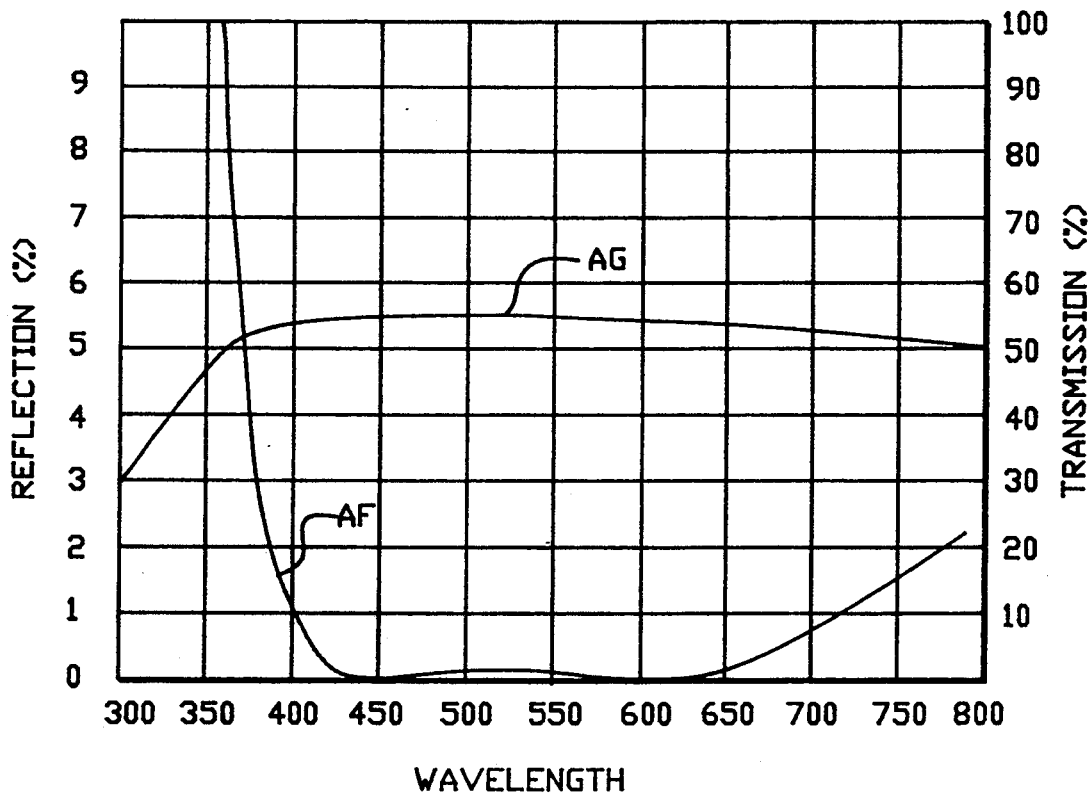
FIG.—22

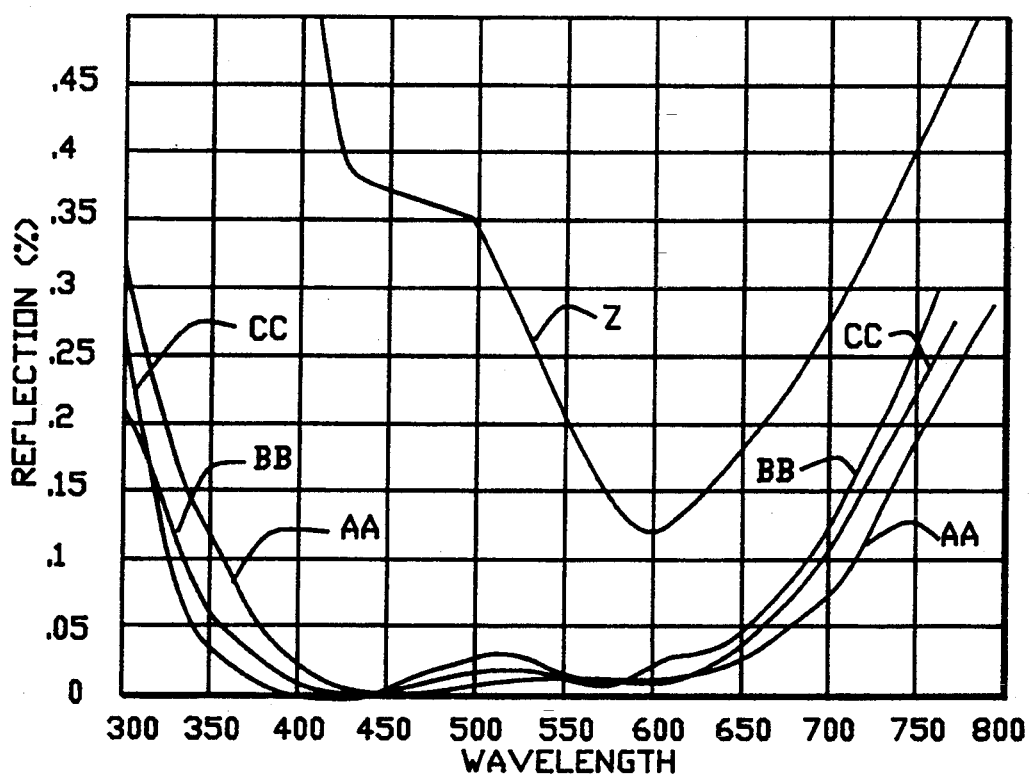
FIG.—24
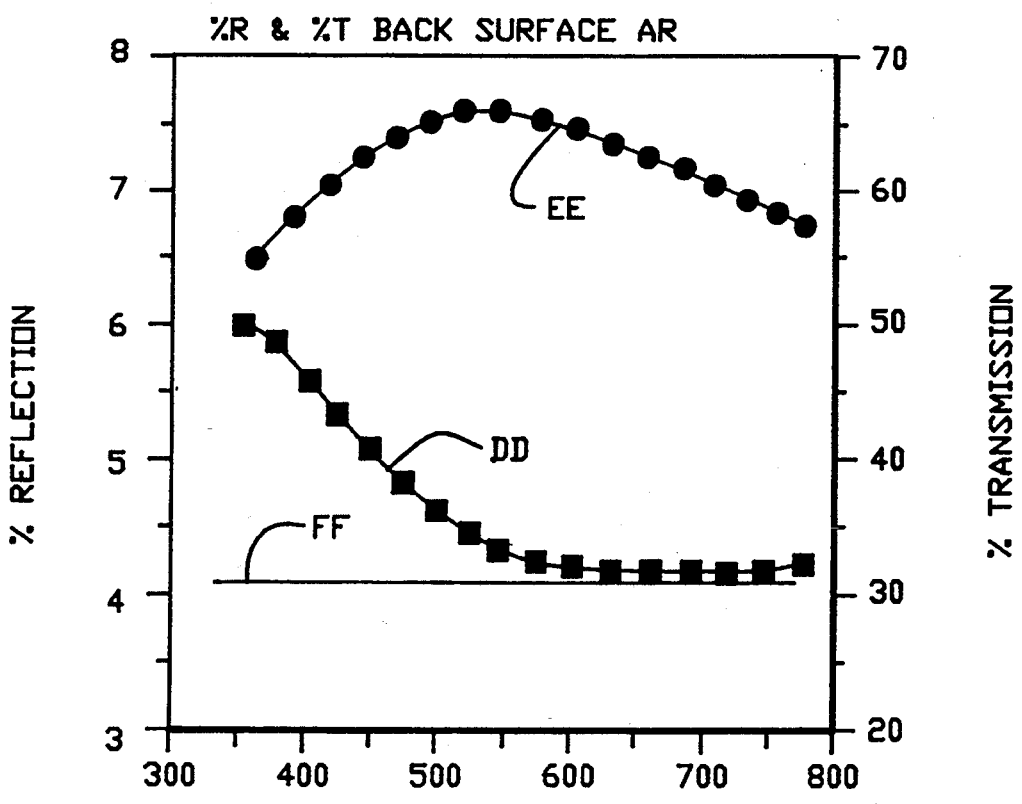
FIG.—25

ELECTRICALLY-CONDUCTIVE, LIGHT-ATTENUATING ANTIREFLECTION COATING

This application is a Continuation-in-Part of Application Ser. No. 07/566,052, filed Aug. 10, 1990 now U.S. Pat. No. 5,091,244.

BACKGROUND OF THE INVENTION

The present invention relates to thin film antireflection coatings, and more particularly to an electrically-conductive, antireflection coating which attenuates light.

Certain articles are fabricated to attenuate light for various reasons such as heat reduction, eye protection and an improved visibility. These articles may also require an antireflection coating on at least one surface thereof. Such articles include sunglasses, solar control glazings and contrast enhancement filters.

In sunglasses, light attenuation protects the eye from bright light, and the antireflection coating reduces reflected glare from the surface of the lens facing the eye. Antireflection properties for sunglasses are usually provided by a multilayer coating comprising vacuum-deposited, transparent, dielectric films. The light attenuation feature may be an intrinsic property of the lens. This feature may also be introduced extrinsically by dying the lens. Preferably, sunglasses attenuate about 90 percent of the visible light.

Solar control glazings attenuate solar energy transmitted to the interior of, for example, a vehicle or building. These glazings preferably have a low reflection treatment on their interior surface to reduce distracting reflections. Low emissivity (E) coatings may be used to reduce reflections. Light attenuation for solar control glazings may be achieved by using a light absorbing glass. Light attenuation may also be provided by a vacuum-deposited, metal film or by a plastic sheet coated with a metal film and attached to the glazing by a suitable adhesive. The light attenuation is about 50 percent of the visible light.

A contrast enhancement filter is often used to enhance image contrast and reduce glare from the screen of a video display terminal (VDT). This filter is located between the VDT operator and the screen. Contrast enhancement filters may be made from light absorbing glass. The glass may transmit about 30 percent of incident light. Light from extraneous sources, such as windows and light fixtures, passes through the filter and is attenuated before it is reflected from the screen. After it is reflected from the screen, it must again pass through the filter before it is observed by the operator. After the second pass, light may be attenuated to about 10 percent of the intensity that it would have had without the filter. If reflectivity of the screen is about 4 percent, the images of extraneous light sources and objects may be reduced by more than 99.5 percent.

Light from the screen image passes through the contrast enhancement filter only once. Thus, it may be attenuated only about 70 percent. As such, visibility of the image is enhanced. A contrast enhancement filter is effective only if its outer facing surface is provided with an antireflection treatment. Preferably, both its inner and outer surfaces should be so treated. The antireflection treatment may comprise a multilayer, antireflection coating. Such a coating may have a perceived reflectivity for visible light, usually called the photopic reflection or the photopic reflectivity, less than about 0.25 percent. Filters having a photopic reflectivity of less than about 0.15 percent are preferable.

A contrast enhancement filter may be made from glass or plastic. If the filter is located close to the cathode ray tube (CRT), it may build-up static charges. Thus, one or both surfaces of the filter is preferably electrically-conductive and grounded to prevent the build-up of static charges. If the filter surfaces are provided with a multilayer, antireflection coating, electrical conductivity may be an intrinsic property of the coating. Electrically-conductive, transparent films, such as indium tin oxide, may be used in such coatings.

The cost of an electrically-conductive filter may be as great as about 30 percent of the cost of the VDT. The high cost of these filters can discourage their use.

It is well known that light-absorbing films may be used to construct antireflection layer systems. The simplest light absorbing systems include a low reflectivity metal film, such as chromium or molybdenum, in contact with a glass or plastic substrate, and a layer of a transparent dielectric material, such as magnesium fluoride or silicon dioxide, in contact with the low reflectivity film. These metal films may be very thin, on the order of about 5 nanometers (nm). The optical properties of such thin films are difficult to control as the metals tend to oxidize during the initial part of the deposition process. Subsequent oxidation or corrosion of the coating may also occur. A thin metal film may also provide inadequate electrical conductivity and only about 40 percent attenuation of visible light.

FIG. 1 shows the computed transmission (curve A) and reflection (curve B) values of a two layer system comprising a chromium film about 1.6 nm thick and a silicon dioxide film about 75.4 nm thick. The films are disposed on a glass substrate having a refractive index of about 1.52. The photopic reflection of the system is about 0.35 percent when observed from the side of the system opposite the substrate, i.e. from the air side of the system. The photopic transmission is about 75 percent.

Another antireflection system is a low E coating including a silver film having a high refractive index and bounded on either side by a dielectric film. The lowest reflection is obtained with relatively thin films of silver, for example 6 to 8 nm thick. Attenuation of visible light, however, is negligible.

The silver-dielectric layer system may be extended to include one additional silver film. This may increase the system's electrical conductivity and improve its antireflection performance. The silver films may be separated by a relatively high refractive index dielectric material having an optical thickness of about one-half wavelength at a wavelength of about 510 nm, which is about the middle of the visible spectrum. Each silver film will also be bounded by a layer of dielectric material. Each dielectric layer will have an optical thickness of about one-quarter wavelength at a wavelength of about 510 nm.

This system is similar in function to the light-transmitting, heat-reflecting coating described in U.S. Pat. No. 4,799,745. The silver films of this coating must be relatively thin to provide the lowest possible reflection. Attenuation of visible light for this coating is on the order of about 10 percent. Sheet resistance may be about ten ohms per square, providing adequate electrical conductivity for most purposes.

FIG. 2 illustrates the transmission (curve C) and reflection (curve D) values for a system comprising two silver films and three dielectric layers. The system is deposited on a glass substrate. The layer sequence and physical thickness, beginning from the substrate, are as follows: zinc oxide (45.7 nm), silver (6.9 nm), zinc oxide (85.3 nm), silver (18.4 nm), and zinc oxide (43.3 nm). The refractive index of the glass substrate is 1.52.

Systems using combinations of a high light absorbing metal, such as chromium, and a low light absorbing metal, such as silver or gold, may also be constructed. Such combinations permit different values of photopic transmission while still providing relatively low reflection from at least one surface. In general, however, systems including a thin soft metal film, such as silver, gold or copper, have poor scratch resistance. Systems including thin films of silver or copper are also vulnerable to corrosion and may deteriorate within a few months when used on an unprotected surface.

The above-described layer systems may produce any one of the following: (1) high electrical conductivity and low reflection, (2) adequate light attenuation and low reflection, or (3) adequate light attenuation and high electrical conductivity. These systems do not provide a single structure which has high electrical conductivity, low reflection and adequate light attenuation.

As such, it is an object of the present invention to provide an electrically-conductive, antireflection layer system that provides a wide range of attenuation values for visible light, while still providing low photopic reflection.

It is a further object of the present invention to provide a light attenuating, antireflection layer system which may have a sheet resistance less than about 100 ohms per square.

It is yet another object of the present invention to provide an electrically-conductive, light attenuating, antireflection layer system which is abrasion and corrosion resistant.

It is also an object of the present invention to provide a corrosion resistant, abrasion resistant, electrically-conductive, adequate light attenuating, antireflection system which may be deposited by DC reactive sputtering in an in-line coating machine of the type used for architectural glass coating.

Additional objects and advantages of the invention will be set forth in the description which follows, and in part will be obvious from the description or may be learned by practice of the invention. The objects and the advantages of the invention may be realized and obtained by means of the instrumentalities and combination particularly pointed out in the claims.

SUMMARY OF THE INVENTION

The present invention is directed to a coating for an article. The coating comprises three layers, the layers being designated the first second and third layers, in numerical order beginning with the layer farthest from the article. The first layer includes a transparent material having a refractive index less than about 1.52 at a wavelength of about 520 nm. The first layer has an optical thickness of about one-quarter wavelength at a wavelength between about 480 and 560 nm. The second layer includes a transparent material having a refractive index greater than the refractive index of the first layer and an optical thickness less than the optical thickness of the first layer. The third layer is a layer including a transition metal nitride and having a thickness of between about 5 and 15 nm. The second layer preferably has a refractive index between about 1.9 and 2.65 at a wavelength of about 520 nm.

The coating may also comprise a fourth layer. The fourth layer includes a transition metal nitride layer having a refractive index (n) and an extinction coefficient (k) less than the less than the n and k of the transition metal nitride of the third layer. The total thickness of the third and fourth layers is between about 5 and 15 nm.

The structure of the present invention provides an electrically-conductive, light-attenuating, antireflection coating. The photopic reflection of the structure may be less than about 0.25 percent. The degree of light attenuation provided by the structure may be about 45 percent. The electrical sheet resistance of the structure may be less than about 1000 ohms per square. The structure is both abrasion and corrosion resistant.

The structure provides high electrical conductivity, low reflection and light attenuation suitable for many applications. It is particularly useful as a coating for a contrast enhancement filter. The structure of the present invention may be applied on a commercial scale by D.C. reactive sputtering in an in-line coating machine of the type used for architectural glass coating.

DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below serve to explain the principles of the invention.

FIG. 8 graphically illustrates the computed reflection and transmission values, as a function of wavelength, for the embodiment referenced in FIG. 7 but using thinner films of titanium nitride.

FIG. 9 graphically illustrates the measured reflection and transmission values, as a function of wavelength, for the embodiment referenced in FIG. 8.

FIG. 14 graphically illustrates the computed reflection and transmission values, as a function of wavelength, for an embodiment of the present invention using silicon dioxide for the first layer, niobium nitride for the second and fourth layers, and zinc oxide for the third layer.

FIG. 15 graphically illustrates the measured reflection and transmission, as a function of wavelength, for the embodiment referenced in FIG. 14.

FIG. 16 graphically illustrates the computed reflection and transmission values, as a function of wavelength, for an embodiment of the present invention using silicon dioxide for the first layer, niobium nitride for the second and fourth layers, and niobium oxide for the third layer.

FIG. 17 graphically illustrates the measured reflection and transmission, as a function of wavelength, for the embodiment referenced in FIG. 16.

FIG. 21 schematically illustrates a four layer structure of the present invention including two different adjacent transition metal nitride layers.

FIG. 22 graphically illustrates the computed reflection and transmission, as a function of wavelength, of an example of the structure of FIG. 21 including titanium nitride and niobium nitride layers.

FIG. 24 graphically illustrates the computed reflection and transmission values of the system of FIG. 14 using a titanium nitride layer with various overcoatings.

FIG. 25 graphically illustrates the measured reflection and transmission values, as a function of wavelength, for a titanium nitride layer.

DETAILED DESCRIPTION OF THE PRESENT INVENTION

Figure 1:
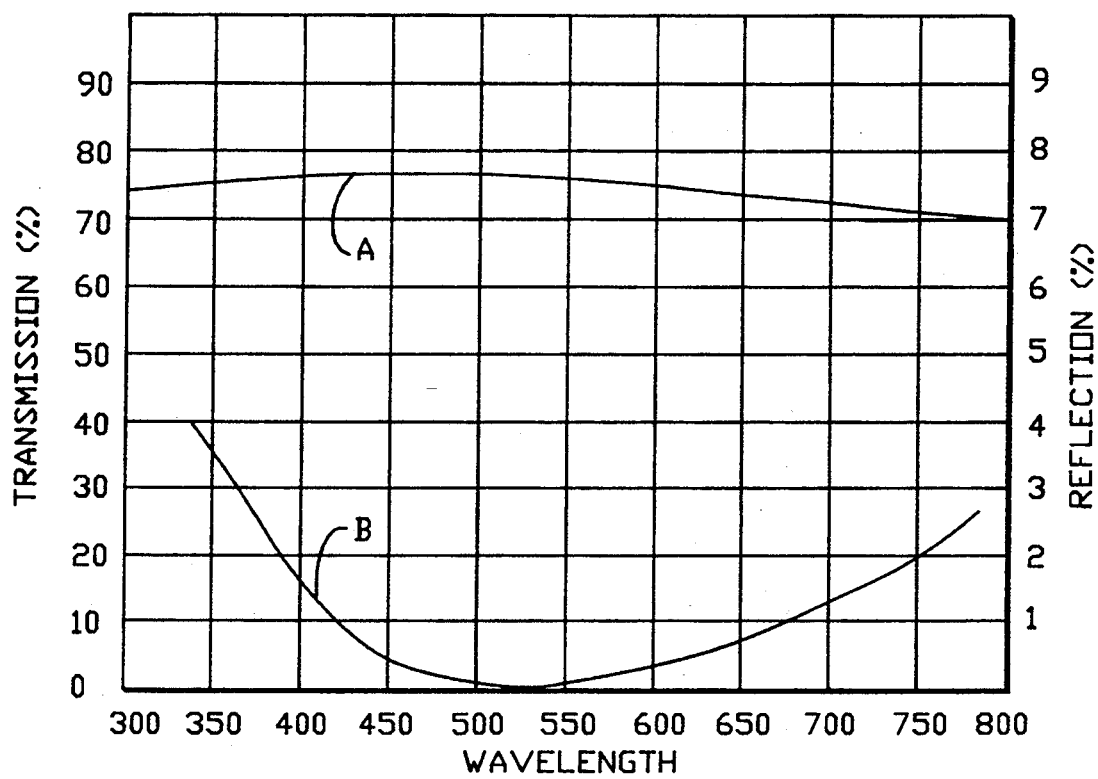
FIG. 1 graphically illustrates the computed reflection and transmission values, as a function of wavelength, of a two layer, light absorbing, antireflection system comprising chromium and silicon dioxide films.
Figure 2:
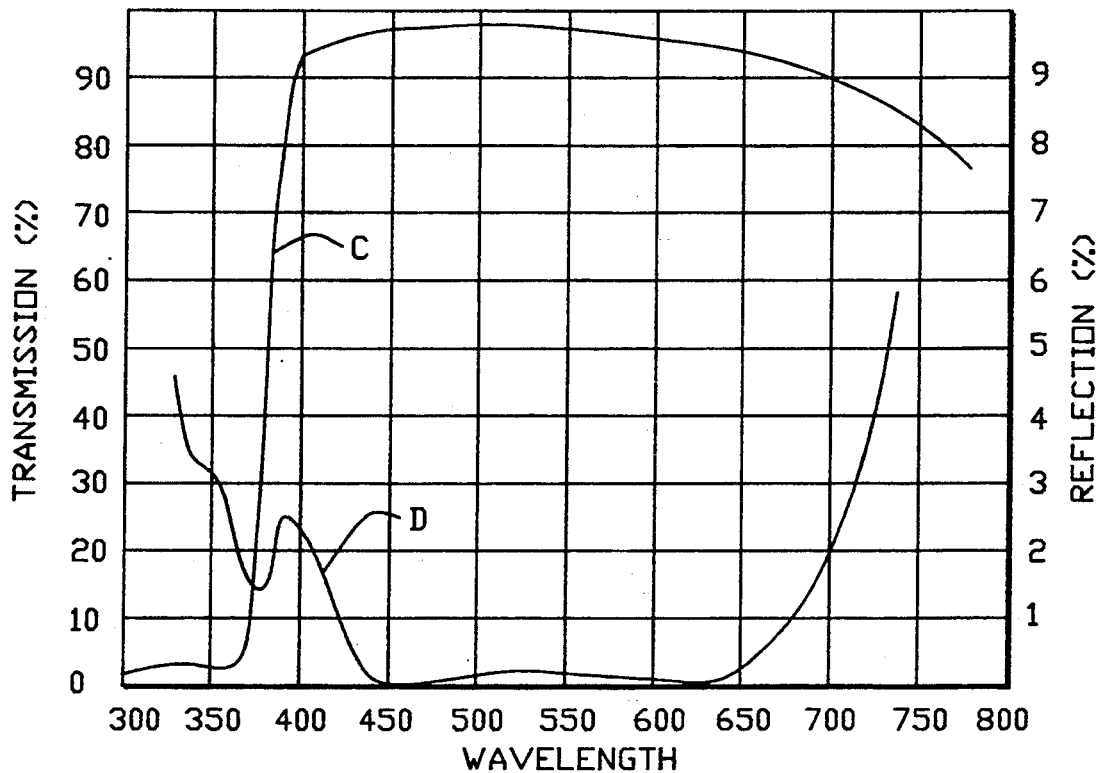
FIG. 2 graphically illustrates the computed reflection and transmission values, as a function of wavelength, of a five layer, light absorbing, antireflection system comprising silver and zinc oxide films.

The present invention uses layers of nitrides of certain transition metals to provide an electrically-conductive, light attenuating, antireflection coating. As such, it provides in one structure or layer system a range of properties which are usually provided by a combination of structures having two of the properties with a substrate having the other.

The transition metals known to form nitrides, and useful in the present invention, include titanium, zirconium, hafnium, vanadium, tantalum, niobium, and chromium.

These transition metal nitrides may have optical properties similar to metals, and they are electrically-conductive. In the form of thin films, they may be hard, abrasion resistant and corrosion resistant.

A preferred method of depositing these films is by DC reactive sputtering of the metal in an atmosphere including nitrogen or ammonia. Films may also be deposited by chemical vapor deposition. The properties of the nitride films may be modified by the inclusion of carbon. Such materials are generally referred to as carbonitrides. The carbon may alter the refection color, the conductivity or the morphology of the film. The structure of the present invention includes layers which substantially comprise transition metal nitrides, i.e., for the most part are transition metal nitrides.

The most common of the transition metal nitrides is titanium nitride. Titanium nitride is used extensively as a plating material for watches and jewelry. It is generally referred to as "gold tone" plating. When deposited on a smooth polished surface, it is very difficult to distinguish from gold. Unlike gold, however, it is hard and has a high degree of scratch resistance. It is also resistant to most corrosive agents encountered in everyday use.

The optical properties of nitrides are discussed in the paper "Selective Transmission of Thin TiN Films", Valkonen et al., *Proc SPIE Int. Soc. Opt. Eng.*, Vol. 401, pp. 375-81 (1983), the entire text of which is hereby incorporated by reference.

The optical properties of metals and light absorbing materials are generally specified in terms of the complex refractive index: n—jk. The values of n (the real part of the complex index) and k (the imaginary part of the complex index) are referred to as the optical constants of a material. They may be different for different crystalline and physical forms of a material.

The optical properties of titanium nitride films are dependent on the films' thickness. In the thicknesses useful in the context of the present invention, i.e. about 3 to 40 nm, the optical constants of the transition metal nitrides may not vary by more than about 20 percent. The present invention may be configured to accommodate variations in optical constants by adjusting film thickness.

The optical constants for titanium nitride films and other transition metal nitrides may vary as a function of process parameters such as sputtering gas flow rate, gas mixture proportions, sputtering pressure, and sputtering power. These variations will be greater at wavelengths longer than about 600 nm. For wavelengths less than about 600 nm, variations may fall within a relatively narrow range, for example, within about fifteen percent.

Table 1 shows the optical constants (n, k) for titanium nitride films about 15 and 25 nm thick. These optical constants were determined by reflection and transmission measurements of films of a known thickness. The films were deposited by DC reactive sputtering from a planar magnetron, using a titanium target, in a flowing argon/nitrogen mixture. The sputtering voltage was 420 volts, the sputtering pressure was 3.17 millitorr, the flow rate for the argon was 250 standard cubic centimeters per minute (sccm), and the flow rate for the nitrogen was 220 sccm. The 25 nm thick films were deposited at a line speed of 75 inches per minute. The 15 nm film was deposited at a line speed of 136 inches per minute.

TABLE 1

Optical Constants of Titanium Nitride

| Wavelength (nm) | 15 nm Thick n | 15 nm Thick k | Wavelength (nm) | 25 nm Thick n | 25 nm Thick k |
| --- | --- | --- | --- | --- | --- |
| 380 | 1.32 | 1.45 | 380 | 1.32 | 1.45 |
| 430 | 1.45 | 1.45 | 430 | 1.34 | 1.42 |
| 470 | 1.48 | 1.48 | 480 | 1.36 | 1.40 |
| 500 | 1.50 | 1.50 | 520 | 1.40 | 1.48 |
| 550 | 1.65 | 1.57 | 550 | 1.47 | 1.46 |
| 600 | 1.83 | 1.74 | 600 | 1.50 | 1.85 |
| 700 | 1.95 | 2.10 | 700 | 1.79 | 2.37 |
| 800 | 2.20 | 2.50 | 800 | 2.15 | 2.95 |

Table 2 shows the optical constants for niobium nitride (NbN) films about 4.89 nm thick. The films were deposited by DC reactive sputtering from a planar magnetron, using a niobium target, in a flowing nitrogen argon mixture.

TABLE 2

Optical Constants of Niobium Nitride (for films 4.89 nm thick)

| Wavelength (nm) | n | k |
| --- | --- | --- |
| 400 | 2.50 | 2.11 |
| 500 | 2.77 | 2.49 |
| 600 | 3.15 | 2.78 |
| 700 | 3.46 | 3.07 |
| 800 | 3.64 | 3.44 |

The optical constants of Table 1 and Table 2 were used in computing the optical properties of the various embodiments of the present invention discussed below. Films of the transition metals may be described as "metal like" with respect to their electrical and reflection properties. The values of the optical constants at visible wavelengths are, however, generally different from metals.

The difference between the optical properties of titanium nitride and niobium nitride and the common metals may be seen by comparing the values n, k of Table 1 and Table 2 with the values n, k for some common metals shown in Table 3.

TABLE 3

| Wavelength (nm) | Metal | n | k |
| --- | --- | --- | --- |
| 500 | Silver | 0.2 | 2.9 |
| 500 | Gold | 0.8 | 1.8 |
| 580 | Chromium | 3.0 | 4.8 |
| 500 | Nickel | 1.8 | 3.4 |
| 500 | Molybdenum | 3.1 | 3.0 |
| 500 | Copper | 1.0 | 2.8 |

The formula for computing the reflectivity and transmission of thin metal films is complex. The following "rules of thumb", however, may serve to help in the understanding the present invention.

The reflectivity or brightness of metals in the form of thick opaque films or polished bulk materials is directly proportional to the ratio of k/n, i.e. the higher this ratio, the brighter the metal. The light transmission through thin metal films increases as the value of n decreases, and, to a lesser extent, as the value of k decreases. Silver is highly reflective in the form of relatively thick films and transparent in the form of relatively thin films. Chromium films having a relatively low value of k/n are not highly reflective. Chromium films are also strongly light absorbing.

Titanium nitride films are also very light absorbing. However, the values of n and k for the films are such that they have to be at least about 30 nm in thickness to absorb about 50 percent of visible light. On the other hand, 4 nm thick chromium films may absorb about 50 percent of the visible light. Titanium nitride films, about 25 nm or more thick, will meet the low sheet resistance objectives of the present invention, i.e. about 200 ohms per square or less. As such, they will provide adequate electrical-conductivity to prevent static charge build-up. They will also provide sufficient light attenuation.

Niobium nitride films absorb light comparable to metal films such as molybdenum. Niobium nitride, however may be at least as conductive as titanium nitride. A total thickness of niobium nitride of about 15 nm was found sufficient to provide sheet resistivity of about 200 ohms per square.

Figure 3:
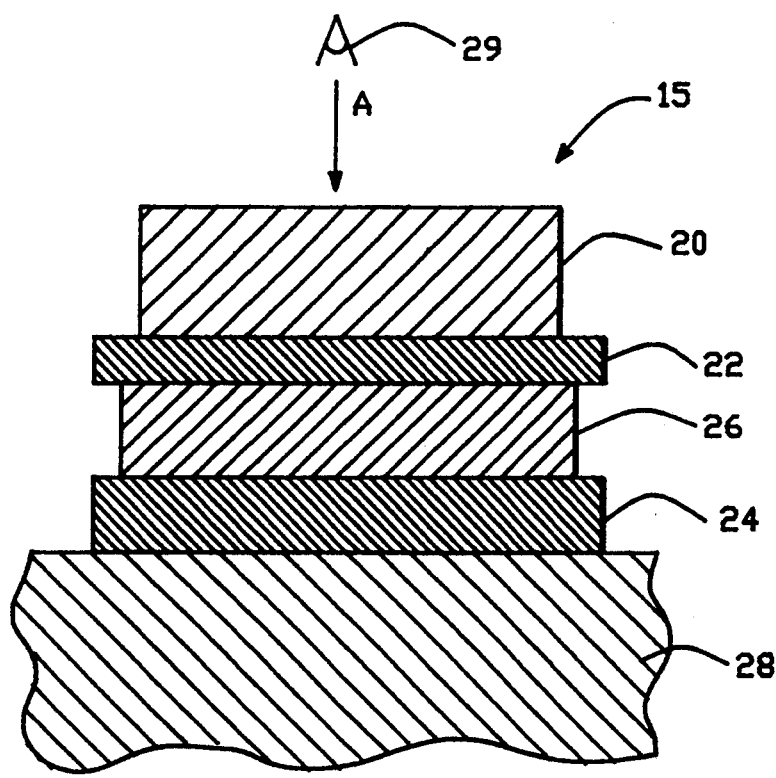
FIG. 3 schematically illustrates a four layer system in accordance with the present invention.

As shown in FIG. 3, a preferred system or structure 15 of the present invention comprises four films 20, 22, 26, and 24 deposited on a glass or plastic substrate 28. The first and outermost film 20 is substantially transparent to visible light and has a refractive index preferably less than about 1.9 at a wavelength of about 510 nm. Its optical thickness is about one-quarter of a wavelength at a wavelength between about 480 nm and 560 nm. Film 26 is also substantially transparent to visible light and has a refractive index in the range from about 1.35 and about 2.65 at a wavelength of about 510 nm. Its optical thickness is less than or equal to about one-quarter wavelength at a wavelength between about 480 and 560 nm. The optical thickness of the film may be less as the refractive index of the film increases.

Layers 22 and 24 are transition metal nitride films each having a physical thickness between about 5 and 40 nm. The exact thickness will depend on the degree of light attenuation and reflection required, and on the refractive index of transparent films 20 and 26. The structure 15 is designed to have the lowest reflectivity when observed by an observer or observing instrument 29 along the direction of arrow A. The structure's reflectivity when viewed through substrate 28 may be higher.

Detailed examples of layer systems in accordance with the present invention are described below. The examples include titanium nitride and niobium nitride layers. In Tables 4 through 16, set forth below and describing different structures in accordance with the present invention, the materials designated TiN(1) and TIN(2) have the optical constants n and k listed in Table 1 for 15 nm and 25 nm thick films, respectively. The material designated NbN has the optical constants of Table 2.

In all the tables, the substrate is assumed to be glass having a refractive index of about 1.52 at a wavelength of about 510 nm. For all computations, the results illustrated in the figures are transmission and reflection values through a single surface or boundary. In all computations, the layer systems have been optimized to yield the lowest possible reflection in the wavelength range from about 425 nm to about 675 nm, i.e., within the generally accepted limits of the visible spectrum.

Figure 4:
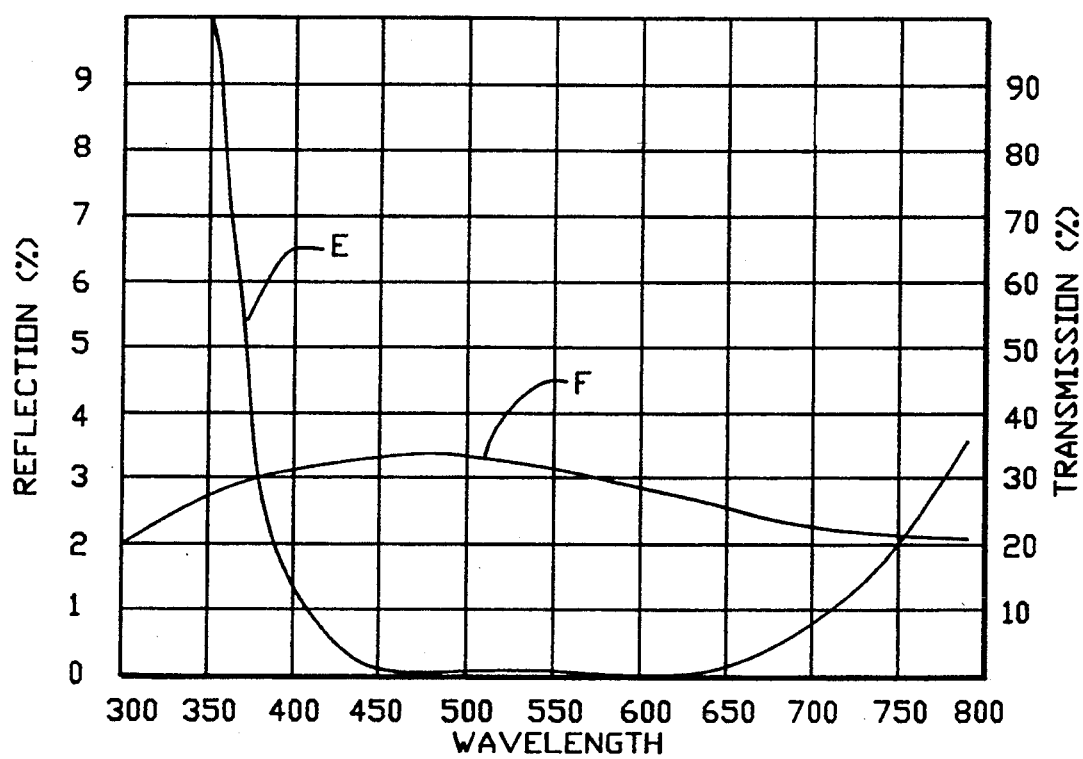
FIG. 4 graphically illustrates the computed reflection and transmission values, as a function of wavelength, for an embodiment of the present invention using silicon dioxide for the first layer, titanium nitride for the second and fourth layers, and tin oxide for the third layer.
Figure 5:
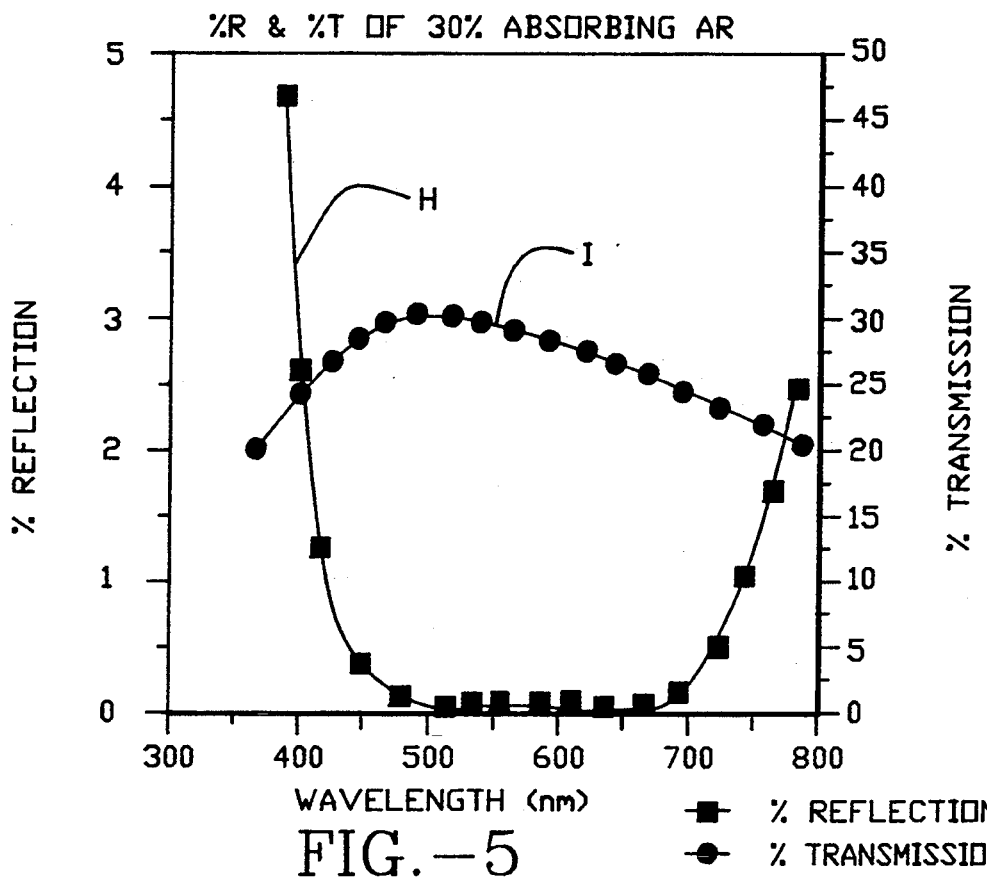
FIG. 5 graphically illustrates the measured reflection and transmission values, as a function of wavelength, for the embodiment referenced in FIG. 4.

A preferred structure 15 may include two titanium nitride (TIN) films 22 and 24, a silicon dioxide ($SiO_2$) film 20, and a tin/oxide ($SnO_2$) film 26. Details of this structure are given in Table 4, and FIG. 4 illustrates the structure's computed reflection (curve E) and transmission (curve F) values. FIG. 5 shows the measured reflection (curve H) and transmission (curve I) values for an actual structure 15 constructed as detailed in Table 4. It can be seen that the structure provides a transmission of about 35 percent, i.e., a light attenuation of about 65 percent. The structure also has a photopic reflectivity of about 0.12 percent, providing superior antireflection properties. This structure also has a sheet resistance of about 66 ohms per square, providing good electrical-conductivity.

TABLE 4

| Layer | Material | Thickness (nm) |
|---|---|---|
|  | Air | Entrance Medium |
| 1 | $SiO_2$ | 75.2 |
| 2 | TiN(1) | 12.7 |
| 3 | $SnO_2$ | 48.4 |
| 4 | TiN(2) | 20.9 |
|  | Glass | Substrate |

As noted above, the titanium nitride film thicknesses of Table 4 were computed using the optical constants for titanium nitride given in Table 1. For the TiN(1) and TIN(2) layers, the values for 15 and 25 nm thick films, respectively, were used. In practice, however, the optical constant values for the 12.7 nm and 20.9 nm films of Table 4 may be slightly different. Furthermore, some differences between the structure's computed and actual optical properties (n, k) may be encountered if the structure is deposited by different sputtering apparatus even though gas mixtures and flow rates may be nominally the same. In practice, such differences may be accommodated for by changing the film thickness. Using a continuous, in-line coating system this may be accomplished within three hours on a trial and error basis.

During deposition, substrates are transported through the machine at a constant speed, i.e. the line speed. The sputtering conditions at each cathode are set to deposit the desired thickness of material during the time the substrate is exposed to the cathode or group of cathodes. Variations in thickness of a few percent may be effected by adjusting the sputtering power.

The relatively simple adjustment from a computed structure to an actual structure is an important feature of the present invention. The adjustment usually involves first an alteration of the thickness of any one of the nitride films to reach the required reflectivity level. The original thickness ratio of the nitride films is maintained during the adjustment. The antireflection region is restored to the desired wavelength range by adjusting the thickness of third film 26, i.e., the transparent film between the nitride films 22 and 24. The thickness of the third film is usually adjusted in the opposite sense to the nitride films.

It has also been determined that the computed structures may have a range of different thickness values which will give optimum low reflection results. The differences between two such structures may be seen as different values of transmission. It is believed that this property of the structure of the present invention may be a reason why the actual optimizations are relatively simple.

Agreement between the computed values of FIG. 3 and the measured result of FIG. 4 is good. The differences at any given wavelength may be accounted for primarily by the wavelength displacement of the curves. The measured curve H is displaced by about 2 to 3 percent to longer wavelengths when compared with the computed curve E.

Samples of the structure of Table 4 have withstood boiling in a five percent solution of sodium chloride (NaCl) for one hour. The structure also showed no damage when subjected to fifty rubs of the standard abrasion test of MIL-C-675A. Thus, the structure demonstrated corrosion and abrasion resistance.

Figure 6:
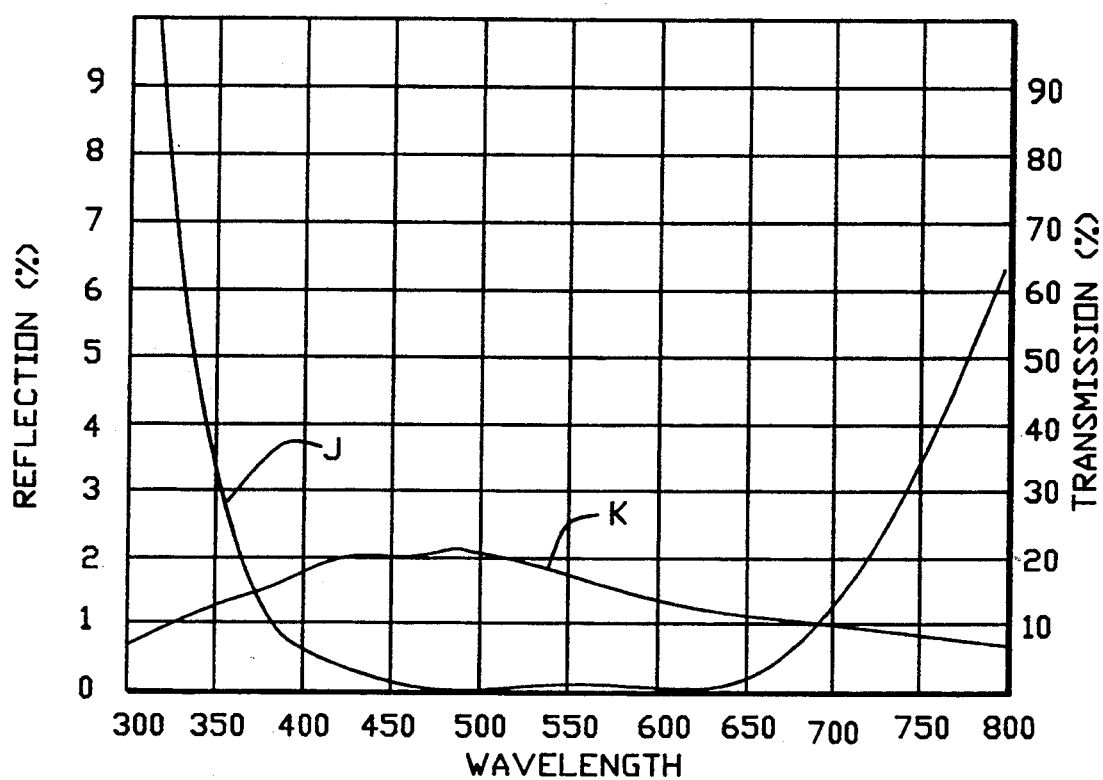
FIG. 6 graphically illustrates the computed reflection and transmission values, as a function of wavelength, for an embodiment of the present invention using alternate optical constants for a titanium nitride film.

A layer system was computed using the optical values of titanium nitride given in a paper by Szczyrbowski et al., "Optical and Electrical Properties of Thin TiN-Layers", *Vakuum Technik*, 37, 14–18 (1988). This structure is shown in Table 5. TIN(3) represents the Szczyrbowski values and TiN(1) the optical constant values for the 15 nm thick film of Table 1. The reflection (curve J) and transmission (curve K) values for this structure are shown in FIG. 6.

TABLE 5

| Layer | Material | Thickness (nm) |
|---|---|---|
|  | Air | Entrance Medium |
| 1 | $SiO_2$ | 65.2 |
| 2 | TiN(1) | 16.1 |
| 3 | $SnO_2$ | 42.4 |
| 4 | TiN(3) | 36.6 |
|  | Glass | Substrate |

The structure of Table 5 may have a photopic reflectivity of about 0.1 percent. The structure of Table 5 demonstrates that the present invention is not limited to the specific optical constants of Table 1.

In the context of the present invention, layer 26 (See FIG. 3) may have a refractive index value from between about 1.35 and 2.65. Although certain values may be preferable, i.e., those between 1.9 and 2.35, all values may provide acceptable low reflection. Different refractive indices for layer 26 may be compensated for by different thicknesses of layers 22 and 24 to provide optimum reflection reduction. For any given refractive index, more than one combination of layer thicknesses may give a low reflection. The difference in the combination may also result in different transmission values. This mechanism may be used to produce a desired value of light attenuation for the structure. The examples below serve to illustrate this principle.

Figure 7:
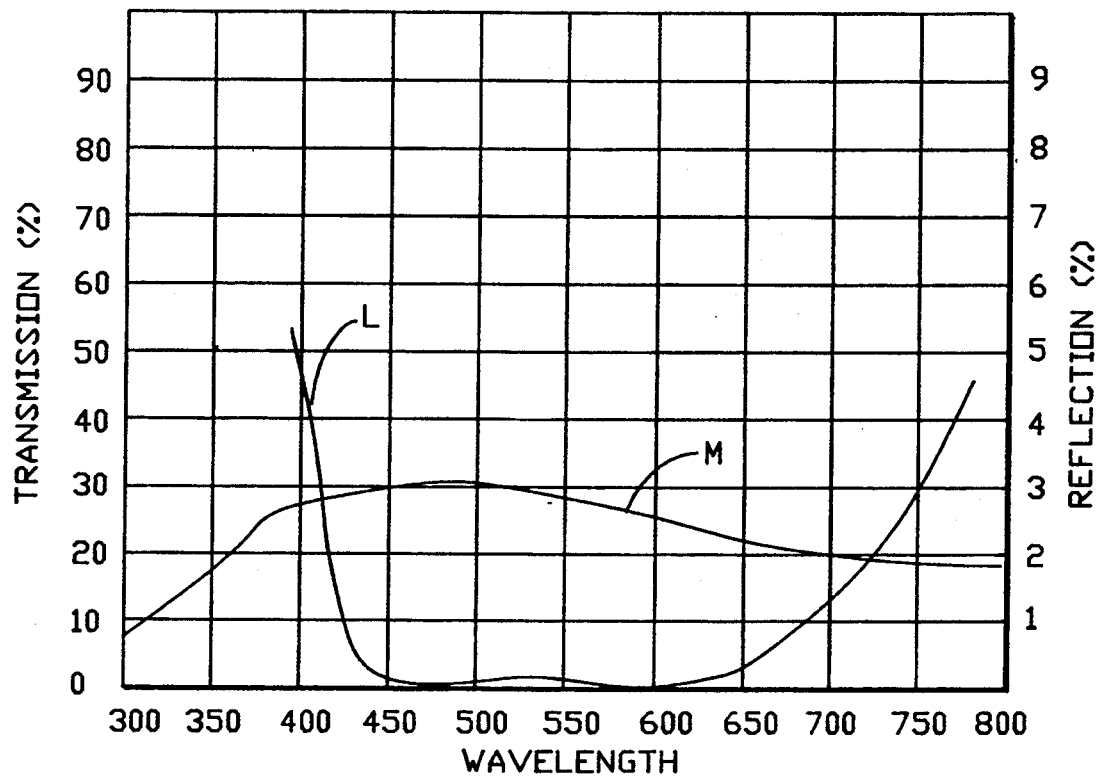
FIG. 7 graphically illustrates the computed reflection and transmission values, as a function of wavelength, for an embodiment of the present invention using silicon dioxide for the first layer, titanium nitride for the second and fourth layers, and titanium dioxide for the third layer.

Table 6 shows details of another embodiment of the present invention. The computed reflection (curve L) and transmission (curve M) values are shown in FIG. 7. In this embodiment, titanium dioxide ($TiO_2$) having a refractive index of about 2.35 at a wavelength of about 510 nm has been used for film 26.

TABLE 6

| Layer | Material | Thickness (nm) |
|---|---|---|
|  | Air | Entrance Medium |
| 1 | $SiO_2$ | 80.0 |
| 2 | TiN(1) | 11.3 |
| 3 | $TiO_2$ | 33.0 |
| 4 | TiN(2) | 29.8 |
|  | Glass | Substrate |

The structure of Table 6 may have a computed photopic reflectivity of about 0.16 percent and photopic transmission of about 30 percent. It can be seen that the total thickness of the titanium nitride layers is about 41 nm. In the embodiment of Table 4, the total thickness of titanium nitride is about 34 nm and the photopic transmission is about 35 percent. The additional titanium nitride material in the embodiment of Table 6 provides greater attenuation of visible light. This can be seen by comparing the transmission values of FIG. 4 to those of FIG. 7.

Table 7 shows the details of another embodiment of the present invention wherein the nitride layers are thinner.

TABLE 7

| Layer | Material | Thickness (nm) |
|---|---|---|
|  | Air | Entrance Medium |
| 1 | $SiO_2$ | 82.2 |
| 2 | TiN(1) | 6.7 |
| 3 | $TiO_2$ | 30.0 |
| 4 | TiN(2) | 19.9 |
|  | Glass | Substrate |

This structure has a computed photopic reflection of about 0.08 percent, and a computed photopic transmission of about 48 percent. The computed values of reflection (curve N) and transmission (curve O) are shown in FIG. 8. The measured reflection (curve P) and transmission (curve Q) values of the structure of Table 7 are shown in FIG. 9. As can be seen from these curves, the structure of Table 7 provides high transmission while providing low reflection. The electrical-conductivity of the structure of Table 7 would be lower than that of Table 6, but would still be adequate for preventing a build-up of static charges.

Figure 10:
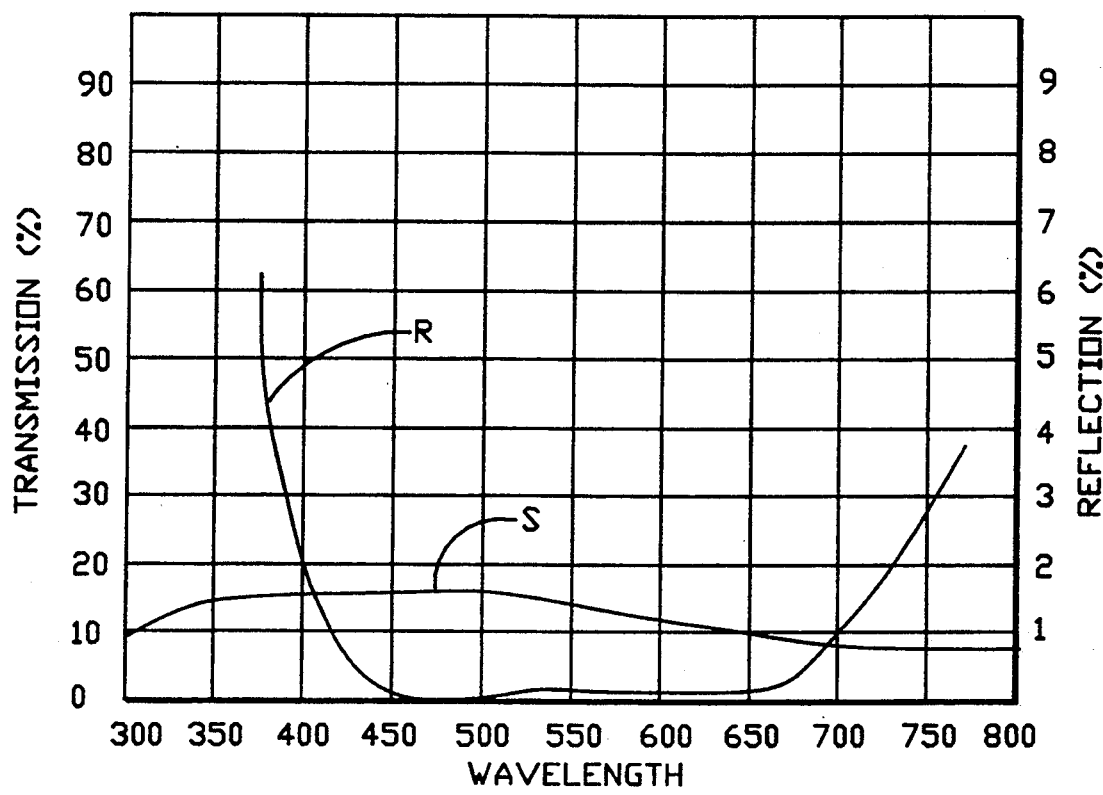
FIG. 10 graphically illustrates the computed reflection and transmission values, as a function of wavelength, for an embodiment of the present invention using silicon dioxide for the first layer, titanium nitride for the second and fourth layers, and silicon dioxide for the third layer.

Table 8 shows details of yet another embodiment of the present invention. The computed reflection (curve R) and transmission (curve S) values are shown in FIG. 10. Silicon dioxide ($SiO_2$) having a refractive index of about 1.46 at a wavelength of about 510 nm has been used to form layer 26.

TABLE 8

| Layer | Material | Thickness (nm) |
|---|---|---|
|  | Air | Entrance Medium |
| 1 | $SiO_2$ | 75.1 |
| 2 | TiN(1) | 21.0 |
| 3 | $SiO_2$ | 74.1 |
| 4 | TiN(2) | 30.5 |
|  | Glass | Substrate |

The photopic reflectivity of the structure may be about 0.2 percent. The total thickness of the titanium nitride layers is about 51 nm giving a photopic transmission of about 15 percent. Comparing the structure of Table 8 with the structure of Table 6 it can be seen that materials with substantially different refractive indices may be used for the third film while still achieving a very low reflection value.

Generally, the lower the refractive index of outer film 20, the lower will be the reflection from the system. The refractive index of layer 20 may be as low as 1.35, although materials having such a low value may not be sufficiently durable to be practical. If the refractive index of film 20 is greater than about 1.46, the range of refractive index values possible for film 26 becomes narrower. Specifically, only relatively high refractive index films may yield a photopic reflectivity of about one-quarter of one percent or less. By way of example, Table 9 shows the construction of a system wherein outer film 20 is aluminum oxide ($Al_2O_3$). Aluminum oxide films may have a refractive index of about 1.65 at a wavelength of about 510 nm. Film 26 is tin oxide which may have a refractive index of about 1.92 at a wavelength of about 510 nm. The photopic reflectivity of the structure may be about 0.49 percent.

TABLE 9

| Layer | Material | Thickness (nm) |
|---|---|---|
|  | Air | Entrance Medium |
| 1 | $Al_2O_3$ | 50.9 |
| 2 | TiN(1) | 22.5 |
| 3 | $SnO_2$ | 44.0 |
| 4 | TiN(2) | 28.0 |
|  | Glass | Substrate |

Table 10 lists details of a layer system or structure wherein outer film 20 is aluminum oxide and film 26 is titanium dioxide, which may have a refractive index of about 2.35 at a wavelength of about 510 nm. The photopic reflectivity of this system is about 0.3 percent.

TABLE 10

| Layer | Material | Thickness (nm) |
|---|---|---|
|  | Air | Entrance Medium |
| 1 | $Al_2O_3$ | 50.9 |
| 2 | TiN(1) | 22.5 |
| 3 | $TiO_2$ | 44.0 |
| 4 | TiN(2) | 28.0 |
|  | Glass | Substrate |

Figure 11:
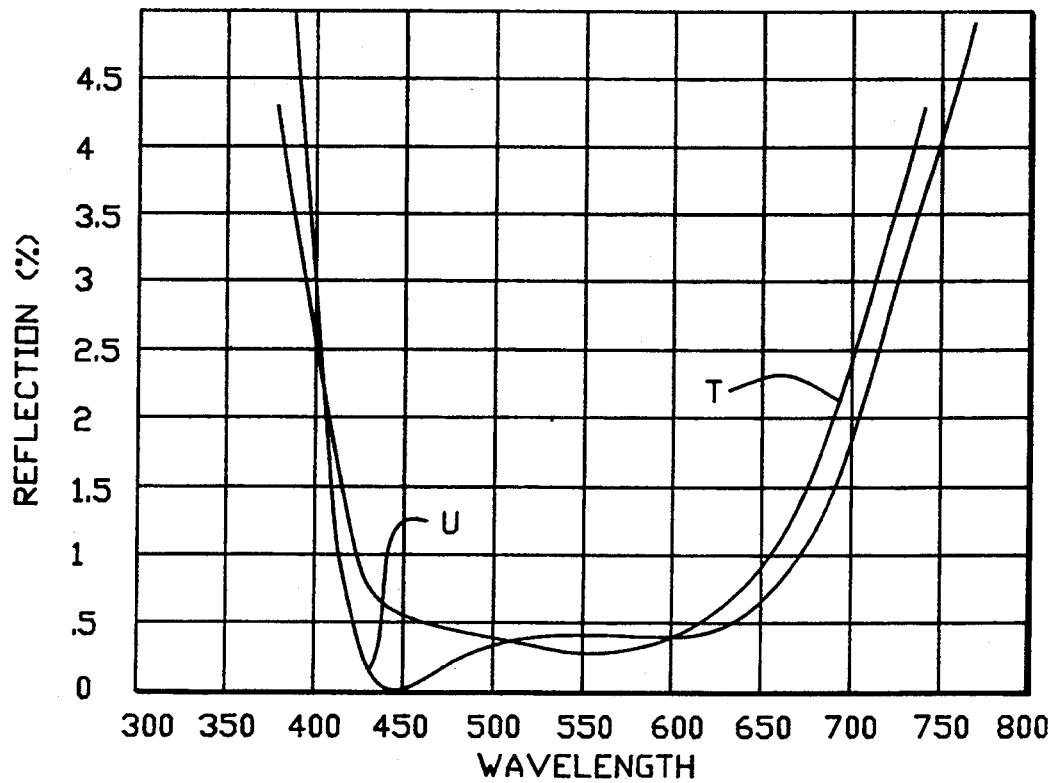
FIG. 11 graphically illustrates the computed reflection values, as a function of wavelength, for embodiments of the present invention using aluminum oxide for the first layer, titanium nitride for the second and fourth layers, and tin oxide or titanium dioxide for the third layer.

FIG. 11 shows the computed reflection values (curve U and curve T) for the structures of Tables 9 and 10, respectively.

It should be evident from the above examples that a practical upper limit for the refractive index of first layer 20 is determined by the availability of transparent materials having a sufficiently high refractive index. Practically, the highest refractive index for a material which is substantially transparent to visible light may be about 2.65, which is about the refractive index of the rutile crystalline form of titanium dioxide.

A structure including titanium nitride films 22 and 24, an outer film 20, having a refractive index of about 1.9, and a film 26, having a refractive index of about 2.65, may have a reflectivity of about 0.75 percent or less. A reflectivity of 0.75 percent may be acceptable for certain applications such as for sunglasses.

Figure 12:
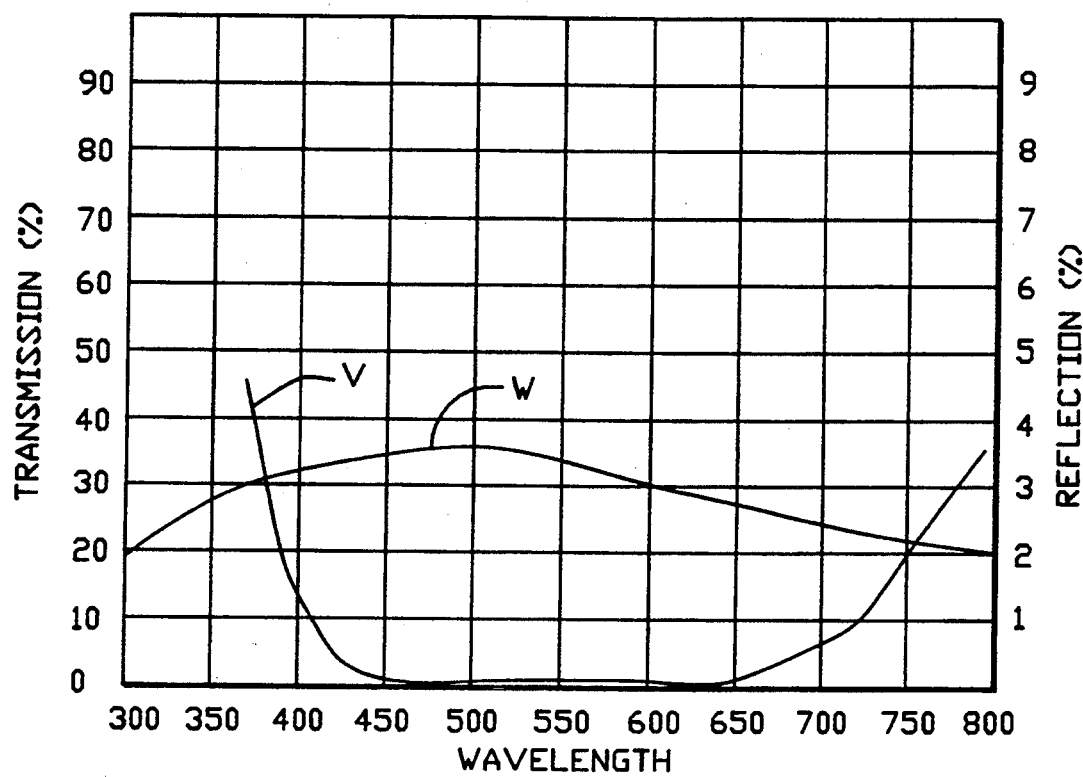
FIG. 12 graphically illustrates the computed reflection and transmission values, as a function of wavelength, for a five layer system of the present invention using silicon dioxide for the first layer, titanium nitride for the second and fourth layers, tin oxide for the third layer, and tin oxide for the fifth layer.

Other embodiments of the present invention may comprise more than four layers. For example, a fifth film may be added between titanium nitride film 24 and substrate 28. The details of such a structure are shown in Table 11. The reflection (curve V) and transmission (curve W) values for this structure are shown in FIG. 12.

TABLE 11

| Layer | Material | Thickness (nm) |
|---|---|---|
|  | Air | Entrance Medium |
| 1 | SiO$_2$ | 75.2 |
| 2 | TiN(1) | 12.4 |
| 3 | SnO$_2$ | 49.6 |
| 4 | TiN(2) | 21.7 |
| 5 | SnO$_2$ | 9.8 |
|  | Glass | Substrate |

The structure of Table 11 may be compared with the structure of Table 4 as the materials of the first four layers in each structure are the same. As can be seen, the additional layer of tin oxide (SnO$_2$) is accommodated for by increasing the thickness of the titanium nitride layers and reducing the thickness of the tin oxide layer therebetween.

Comparing the curves of FIG. 12 with those of FIG. 4 illustrates that the addition of the fifth layer may not yield a significant improvement in antireflection performance or a significant difference in the attenuation of visible light. Variations of the above-described five layer structure wherein the refractive index of the fifth layer was varied from 1.35 to 2.65 at a wavelength of about 510 nm have been investigated. It has been determined that for all values of refractive index, a layer thickness sequence may be established which may yield a photopic reflectivity of about 0.25 percent. For all values of refractive index, the thickness of the fifth layer was less than one-eighth wavelength in the wavelength range from about 480 nm to 560 nm.

Figure 13:
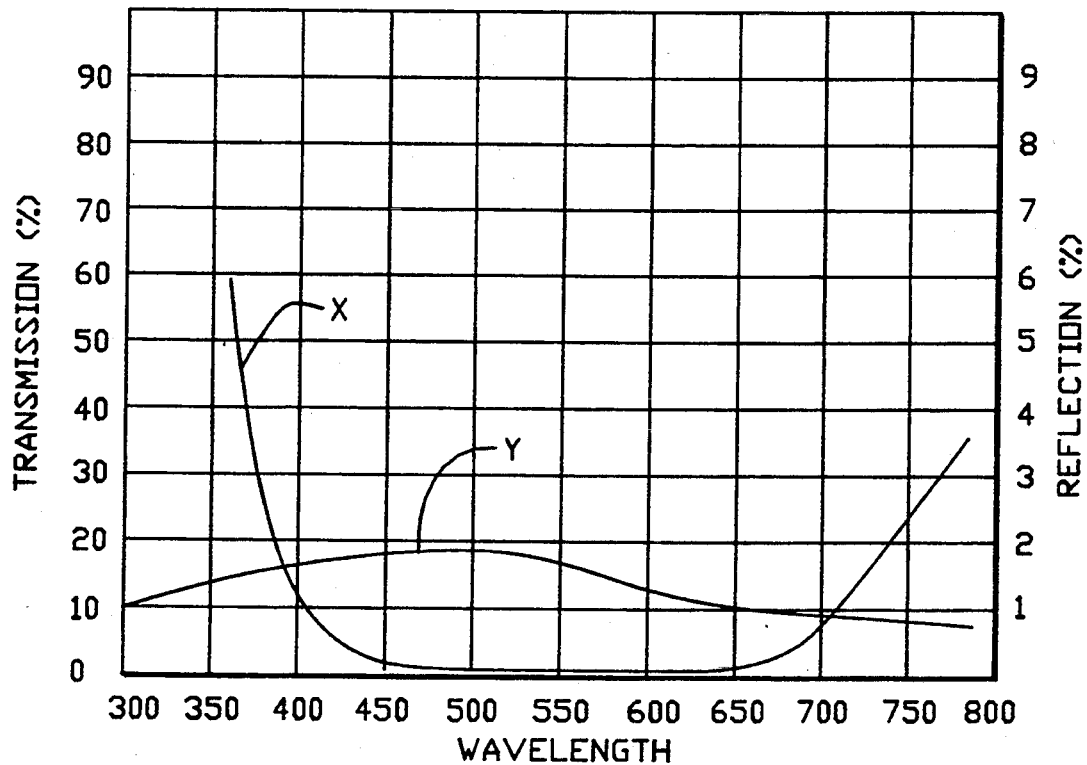
FIG. 13 graphically illustrates the computed reflection and transmission values, as a function of wavelength, for a six layer system of the present invention using silicon dioxide for the first layer, titanium nitride for the second, fourth and sixth layers, and tin oxide for the third and fifth layers.

Another embodiment of the present invention comprises six layers. This embodiment includes three transition metal nitride layers separated by a film of material substantially transparent to visible light. The layer system of such a structure is illustrated by reference to Table 12. The structure's reflection (curve X) and transmission (curve Y) values are shown in FIG. 13.

TABLE 12

| Layer | Material | Thickness (nm) |
|---|---|---|
|  | Air | Entrance Medium |
| 1 | SiO$_2$ | 75.1 |
| 2 | TiN(1) | 14.5 |
| 3 | SnO$_2$ | 49.2 |
| 4 | TiN(2) | 23.6 |
| 5 | SnO$_2$ | 38.2 |
| 6 | TiN(1) | 7.9 |
|  | Glass | Substrate |

The structure of Table 12 may have a photopic reflectivity of about 0.1 percent. The reflectivity is not significantly lower than the four film structure of Table 4. The additional titanium nitride layer, however, provides a photopic transmission of about 17 percent compared with about 35 percent for the four film structures.

Yet another embodiment of the present invention is described in Table 13. Here niobium nitride is used for the transition metal nitride films (Films 22 and 24 in FIG. 3). Silicon dioxide is used for outer film 20 and zinc oxide (ZnO) is used for third film 26.

TABLE 13

| Layer | Material | Thickness (nm) |
|---|---|---|
|  | Air | Entrance Medium |
| 1 | SiO$_2$ | 82 |
| 2 | NbN | 5 |
| 3 | ZnO | 65 |
| 4 | NbN | 9 |

The photopic reflection of the example of Table 13 is about 0.12. The computed values for reflection (Curve II) and transmission (Curve JJ) as a function of wavelength are shown in FIG. 14. Measured values of reflection (Curve KK) and transmission (Curve LL) are shown in FIG. 15. The example of Table 13 had a sheet resistance of about 200 ohms per square.

Another embodiment of the present invention incorporating niobium nitride films is shown in Table 14. Here niobium oxide (Nb$_2$O$_5$) having a refractive index of about 2.35 at a wavelength of about 510 nm is used for third film 26.

TABLE 14

| Layer | Material | Thickness (nm) |
|---|---|---|
|  | Air | Entrance Medium |
| 1 | SiO$_2$ | 87.7 |
| 2 | NbN | 3.6 |
| 3 | Nb$_2$O$_5$ | 49.0 |
| 4 | NbN | 10.2 |
| 5 | Glass | Substrate |

The photopic reflection of the example of Table 14 is about 0.10. The computed values for reflection (Curve MM) and transmission (Curve NN) as a function of wavelength are shown in FIG. 16. Measured values of reflection (Curve OO) and transmission (Curve PP) are shown in FIG. 17. The example of Table 14 had a sheet resistance of about 200 ohms per square.

Layer systems incorporating niobium nitride exhibited the same durability characteristics as the layer systems incorporating titanium nitride. Comparison of FIG. 15 with FIG. 5 shows that the transmission color of a niobium nitride based layer system may be more neutral than a titanium nitride based layer system. The sheet resistance of a niobium nitride based layer system, however, may be higher than a titanium nitride based layer system.

Figure 18:
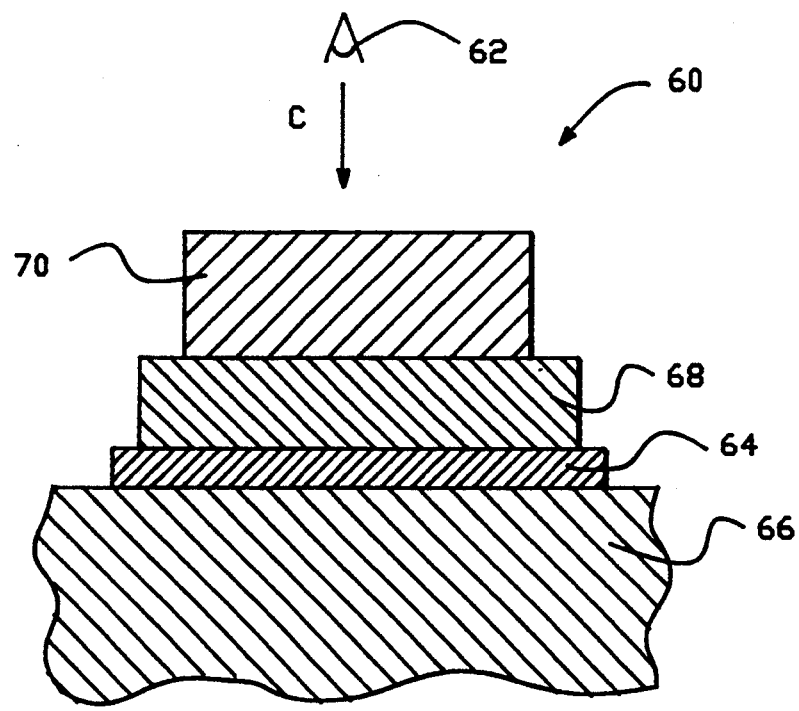
FIG. 18 schematically illustrates a three layer structure of the present invention including a single transition metal nitride layer.

In still another embodiment of the present invention a three layer system including only one transition metal nitride film may be used to provide an electrically conductive light attenuating anti-reflection coating. Referring now to FIG. 18, a three layer structure 60 is designed to be effective for an observer 62 viewing in the direction of arrow C. The structure 60 includes a transition metal nitride layer 64 adjacent to substrate 66. The transition metal nitride layer 64 is overcoated with a transparent layer 68 having a relatively high refractive index. Layer 68 is in turn overcoated with a transparent layer 70 having a relatively low refractive index. Preferably layer 70 has a refractive index less than the refractive index of the substrate. Layer 70, for example, may have a refractive index less than about 1.52, and an optical thickness of about one-quarter wavelength at a wavelength between about 480 and 560 nm. Layer 68 has a refractive index higher than the refractive index of layer 70. Layer 68 preferably has a refractive index between about 1.9 and 2.65 at a wavelength of about 520 nm. Generally, layer 64 has an optical thickness less than the optical thickness of layer 70.

Transition metal nitride layer 64 may have a physical thickness between about 5 and 15 nm.

Table 15 shows details of the construction of a three layer coating according to the last-described embodiment. Here, layer 70 includes silicon dioxide, layer 68 includes titanium dioxide, and layer 64 includes niobium nitride. Substrate 66 has a refractive index of about 1.52.

TABLE 15

| Layer | Material | Thickness (nm) |
| --- | --- | --- |
|  | Air | Entrance Medium |
| 1 | SiO$_2$ | 84.0 |
| 2 | TiO$_2$ | 37.5 |
| 3 | NbN | 7.8 |
|  | Glass | Substrate |

Figure 20:
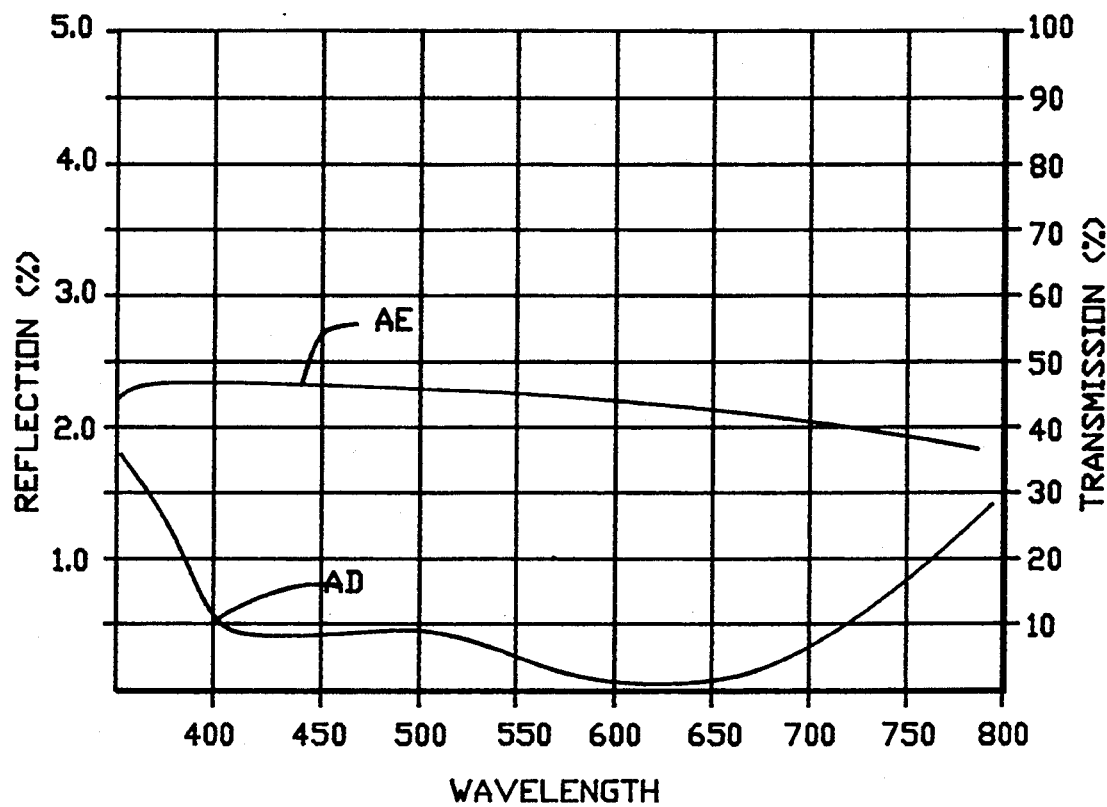
FIG. 20 graphically illustrates the measured reflection and transmission, as a function of wavelength, of the example of FIG. 19.
Figure 19:
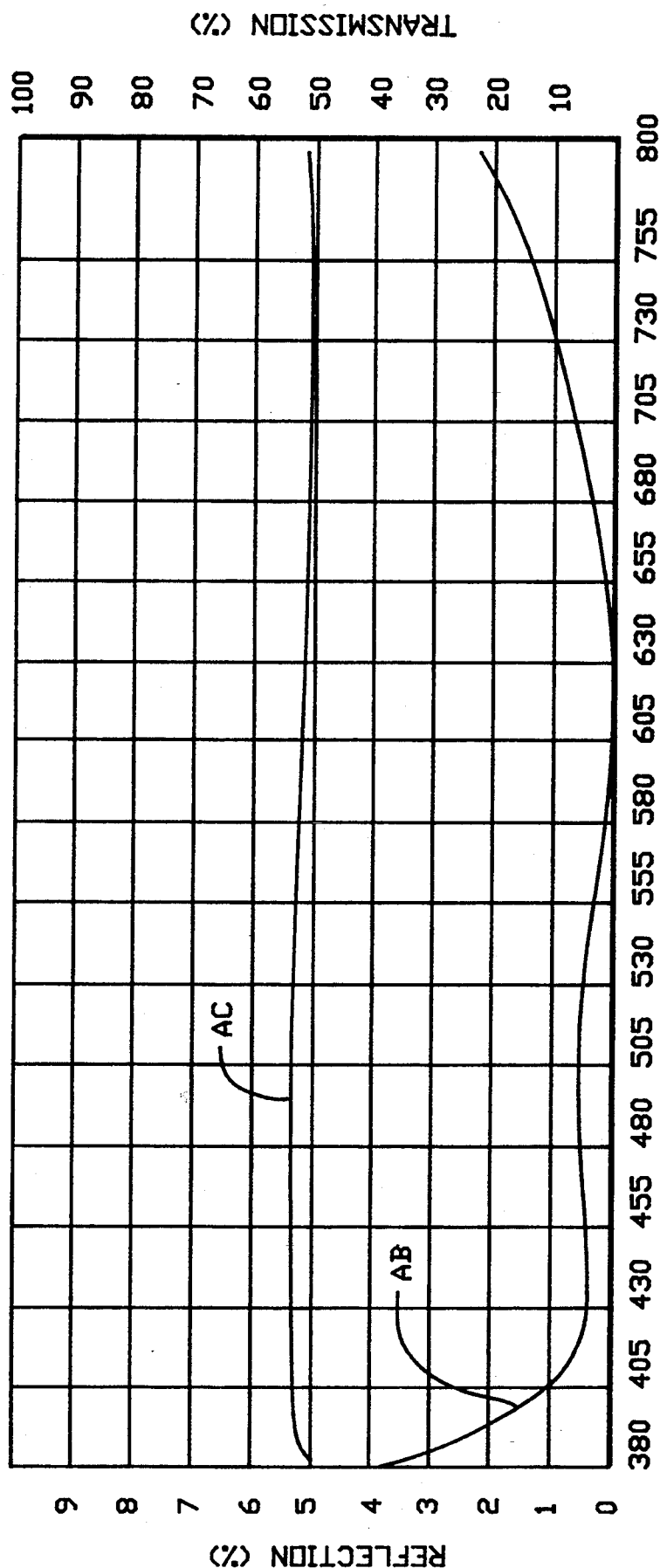
FIG. 19 graphically illustrates the computed reflection and transmission, as a function of wavelength, of an example of the structure of FIG. 18.

The computed reflection (Curve AB) and transmission (Curve AC) as a function of wavelength of the layer system of Table 15 is shown in FIG. 19. The measured reflection (Curve AD) and transmission (Curve AE) as a function of wavelength for a coating having the construction of Table 15 is shown in FIG. 20.

The layer system of Table 15 may be useful if less light attenuation is required than is provided by earlier-described four layer embodiments of the present invention. Referring again to FIGS. 19 and 20, it can be seen that the system of Table 15 may provide about forty-five percent attenuation of visible light. This three layer embodiment may not, however, provide as low a reflection as may be provided by a four layer embodiment. Generally photopic reflection may be less than about 0.25 percent.

The three layer system exemplified in Table 15 may be extended, by adding an additional layer of a transition metal nitride, to provide yet another four layer embodiment of the present invention including two adjacent transition nitride layers having different optical properties. Referring now to FIG. 21, a four layer structure 72 is designed to be effective for observer 62 looking in the direction of arrow C. Structure 72 includes a transition metal nitride layer 74 overcoated with a layer 76 including a transition metal nitride having optical properties different from the optical properties of layer 74. The transition nitride layers are overcoated with transparent layers 68 and 70 which, generally, have the same function as the transparent layers in structure 70 and thus have the same identifying numerals. Layer 70 generally has a refractive index less than the refractive index of substrate 66 and an optical thickness of about one-quarter wavelength at a wavelength between about 480 and 560 nm. Layer 70 preferably has a refractive index less than about 1.52. Layer 68 has a higher refractive index than layer 70, and preferably has a refractive index between about 1.9 and 2.65 at a wavelength of about 520 nm. Generally, layer 68 has an optical thickness less than the optical thickness of layer 70. Layer 74 preferably includes a transition metal nitride having optical constants (n and k) less than about 2.0. Layer 76 preferably includes a transition metal nitride having optical constants (n and k) greater than about 2.0. The total thickness of transition nitride layers 74 and 76 may be between about 5 and 15 nm. The optical constants are specified for a wavelength of about 520 nm.

Table 16 shows details of a layer system having adjacent layers of titanium nitride and niobium nitride.

TABLE 16

| Layer | Material | Thickness (nm) |
| --- | --- | --- |
|  | Air | Entrance Medium |
| 1 | SiO$_2$ | 84.0 |
| 2 | TiO$_2$ | 33 |
| 3 | NbN | 4.5 |
| 4 | TiN | 6.7 |
|  | Glass | Substrate |

The computed reflection (Curve AF) and transmission (Curve AG) as a function of wavelength is shown in FIG. 22. Referring now to FIGS. 20 and 22 it can be seen that while light attenuation (transmission) is about the same, a system having two different adjacent transition metal nitride layers may have significantly lower reflection than a three layer system having only one transition metal nitride layer. Specifically the four layer system having two adjacent transition metal nitride layers may have a photoptic reflectivity less than about 0.15 percent.

Structures 60 and 72 may have a sheet resistance less than about 1000 ohms per square.

In any of the above-described embodiments, it may be possible to replace one or more transparent materials with two or more thinner layers, i.e sub-layers, having about the same total optical thickness but different refractive indices. This technique is well known in the art as a way of simulating a layer of material having a specific refractive index. The two or more sub-layers may be referred to as the optical equivalent of the layer being simulated. The technique may be used, for example, when a material having some desired value of refractive index does not exist, is not easily deposited, or does not have suitable physical properties. Use of such optical equivalent sub-layers is possible without departing from the spirit and scope of the present invention.

In describing the present invention only layers which are optically functional, that is, necessary to describe the optical principle of the invention, have been described. It is, however not uncommon in the art to use in a multilayer coating one or more layers primarily for improving the mechanical integrity of the coating. Such layers are generally referred to as glue layers or adhesion layers. They may be located between adjacent optically functional layers or between an optically functional layer and the substrate on which the coating is located. The thickness and the material of an adhesion layer may be chosen such that it is optically insignificant or an adjacent optically functional layer may be altered to compensate any optical effect the adhesion layer may have on the coating. Use of such optical equivalent sub-layers is possible without departing from the spirit and scope of the present invention.

The reflectivity values given for the above-described embodiments are the values observed from the side of the structures farthest from the substrate. It is well known that structures including light absorbing films may have different reflection values on different sides of the structure.

A structure including titanium nitride, or another transition metal nitride, may be designed to reduce reflection as observed from the substrate side of a coated article or device. Such a structure may require no more than two layers, one of which is a nitride layer, to provide a very low photopic reflection.

Figure 23:
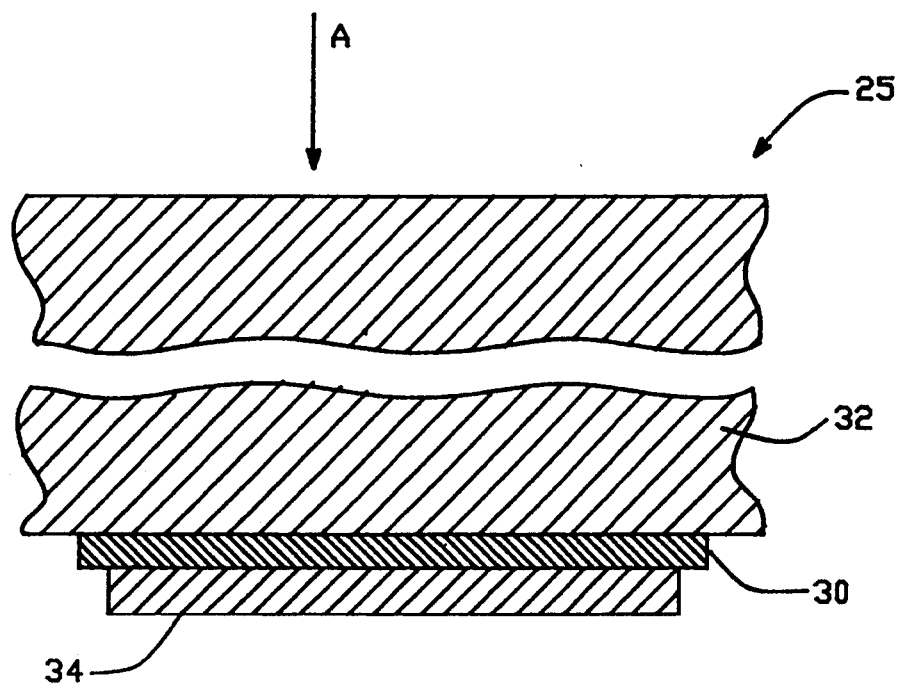
FIG. 23 schematically illustrates a two layer system in accordance with the present invention.

Such an embodiment of the present invention is shown in FIG. 23. The structure 25 includes a thin film of nitride 30 deposited on a substrate 32. A film 34 of a material substantially transparent to visible light is deposited on nitride film 30. The film thicknesses are adjusted to provide the lowest reflectivity for visible light as observed in the direction of arrow A. The nitride layer 30 may be between about 5 and 10 nm thick. A titanium nitride layer, for example is preferably about 8 nm thick. The transparent layer may be between about 2 and 15 nm thick, depending on the refractive index of the transparent material. The refractive index of this layer is between about 1.35 and 2.65 at a wavelength of about 510 nm.

Layer 30 may be titanium nitride, and layer 34 may be silicon dioxide, tin oxide or titanium dioxide. The optical constants of titanium nitride can be those shown in Table 1 for a 15 nm thick film. The thickness of layer 34 can be about 2.5 nm for titanium dioxide having a refractive index of about 2.35 at a wavelength of about 510, nm and about 10.8 nm for silicon dioxide having a refractive index of about 1.46 at a wavelength of about 510 nm.

FIG. 24 shows the computed reflectivity of a titanium nitride film (curve Z), and of a titanium nitride film overcoated with silicon dioxide (curve AA), tin oxide (curve BB), or titanium dioxide (curve CC). The reflectivity values in FIG. 24 are shown on a scale of 0 to 1 percent to highlight the difference in reflection obtained with different overcoating materials. As can be seen, the reflection value is very low for a wide range of refractive indices of different overcoatings or layers 34. Any refractive index in the range from about 1.35 to about 2.65 at a wavelength of about 510 nm may be used to produce an effective coating.

FIG. 25 shows the measured reflection (curve DD) and transmission (curve EE) values for a single film of titanium nitride about 8 nm thick on a glass substrate (n=1.52). The figure includes the reflection from an uncoated surface of the substrate (curve FF). The measured reflection curve DD (FIG. 16) may be compared with the computed curve Z (FIG. 15). The measured curve DD shows a minimum value more or less the same as the computed curve Z. The minimum value of the measured curve occurs at a larger wavelength than the computed curve. The measured data is for the reflection as viewed through the substrate.

In the above-described embodiments, titanium nitride and niobium nitride have been used as the transition metal nitride. It will be apparent, however, that any of the transition metal nitrides may be used in the structure of the present invention. For example, other transition metal nitrides may be useful to provide different levels of transmission or different values of sheet resistance. In structure 15 (See FIG. 3) it may also be useful to use a different transition metal nitride for each of the two transition metal nitride layers.

In the above-described embodiments, metal oxides have been used as the transparent materials. It will be apparent, however, that other materials may be used, for example a substantially-transparent nitride, such as silicon nitride, or an oxynitride, such as silicon oxynitride. Materials such as fluorides and sulfides may also be used although they may not be easily deposited by reactive sputtering.

The coating of the present invention may be included in a contrast enhancement filters. Such filters are most effective if they have antireflection coatings on both surfaces. A light attenuating, antireflection coating may be applied to one surface only. The other surface may receive another type of antireflection coating. This other coating may be the two layer embodiment of the present invention shown in FIG. 23 or may be a single layer between about 5 and 10 nm thick of a transition metal nitride.

Figure 26:
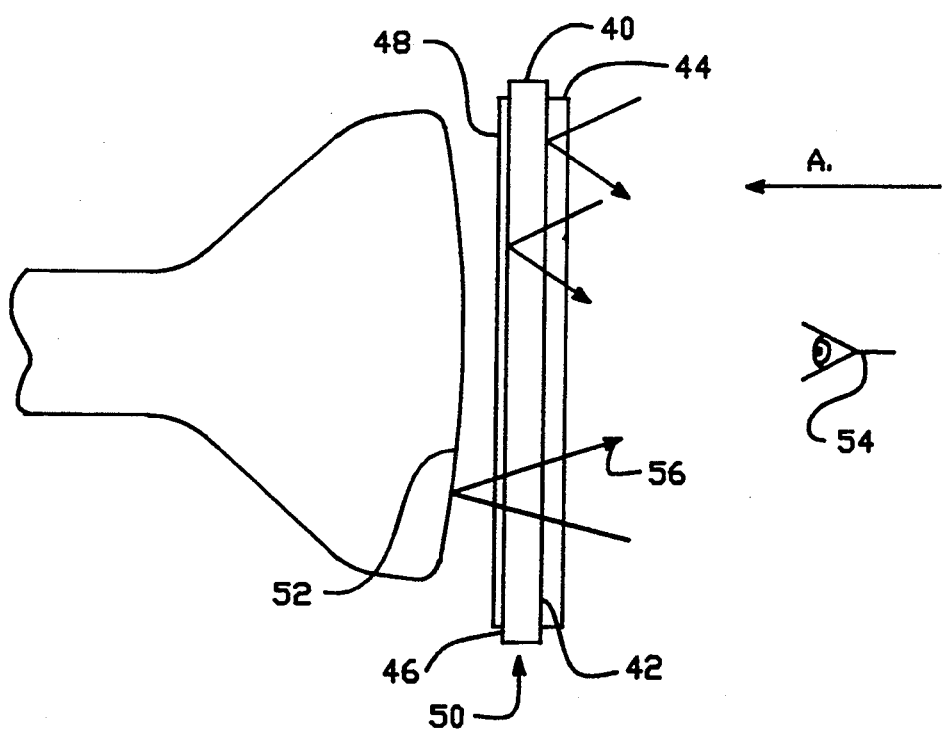
FIG. 26 schematically illustrates a contrast enhancement filter used in conjunction with a video display screen.

As is shown in FIG. 26, a contrast enhancement filter 50 may be disposed in front of a VDT screen 52. The filter 50 includes a transparent substrate 40. Substrate 40 may be coated on its surface 42 with a four layer coating according to structure 15, structure 60 or structure 72. The surface 46 of substrate 40 may be coated with the two-layer structure 25 or with a single layer of a transition metal nitride having a thickness between about 5 and 10 nm.

The low reflection sides of coatings 15 and 25 face an observer or operator 54 as indicated by arrows B and C. The direction of observation is indicated by arrow A. The light attenuating property of filter 50 causes the suppression of reflection 56 from screen 52.

Figure 27:
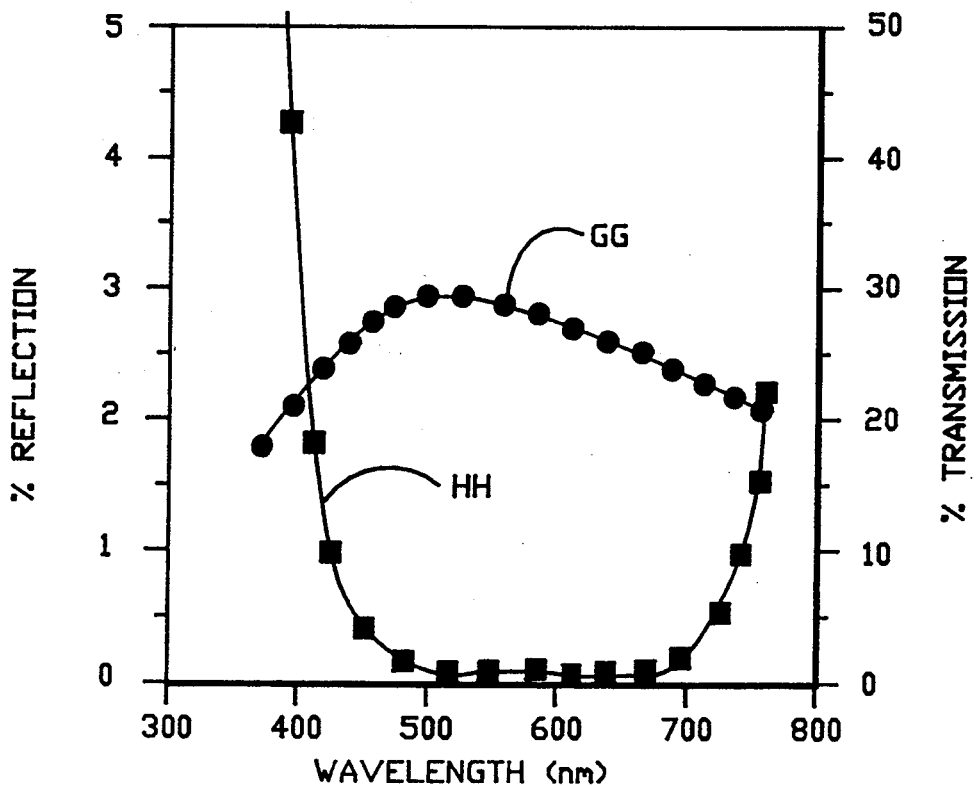
FIG. 27 shows the measured reflection and transmission values, as a function of wavelength, for a contrast enhancement filter coated on one side with a four layer system in accordance with the present invention and coated on the opposite side with a single layer of titanium nitride.

FIG. 27 shows the measured transmission (Curve GG) and reflection (curve HH) values of contrast enhancement filter 50. The reflection measurement was taken in the direction of arrow A. Surfaces 40 and 46 have a sheet resistance less than about 1000 ohms per square. As such, if surfaces 40 and 46 are electrically grounded, the build-up of static charges may be prevented.

A contrast enhancement filter is but one application of the present invention. It will be apparent from the embodiments described that the present invention may be used in other applications, including solar control glazings, sunglasses and protective eyewear. Embodiments of the present invention may be used on one or both surfaces of an article or device. Embodiments of the present invention may be used on one surface of an article having another type of thin film interference coating on the opposite surface. Embodiments of the present invention may also be used on one surface of an article having an antireflection treatment, such as a chemical etch, on the opposite surface. The choice of coating combinations is determined by the specific requirements of the article.

The materials used to construct the above-described embodiments may also be, and have been, deposited in commercially-available machines, using commercially available sputtering cathodes. The materials may also be deposited in a continuous, in-line sputtering or other machine. The materials may be deposited by DC reactive sputtering or other process. The optical properties of the films, however, as already noted, may be different and the differences must be considered in determining suitable film thickness.

The machine used to deposit the structure or coatings of Tables 4 and 7, and of FIGS. 23 and 26 was an in-line sputter coating machine. The machine includes five separate chambers separated by vacuum locks. Each chamber may contain up to 3 sputtering cathodes which may be planar magnetrons or rotating cylindrical magnetrons. The apparatus will accept substrates up to two meters long by one meter wide. In the above described embodiments, the titanium nitride films were deposited using planar magnetrons. The silicon dioxide and tin oxide films were deposited using rotating cylindrical magnetrons.

The above-described, in-line sputtering machine is a modified D1 model coater supplied by Airco Coating Technologies Inc. of Fairfield, Calif. Modifications to the machine include: replacement of the original Edwards oil diffusion pumps with Varian (Palo Alto, Calif.) Model 185 oil diffusion pumps to provide a two fold increase in pumping capacity; the addition of a separate pump aperture over the vacuum lock tunnels to reduce pressure fluctuations during substrate passage through the vacuum locks; and the replacement of the original plastic gas inlet tubes with stainless steel tubes. The rotating magnetrons were equipped with an arc suppression structure and shielding as described in co-pending application Ser. No. 07/565,921, filed Aug. 10, 1990, entitled "Shielding for Arc Suppression in Rotating Magnetron Sputtering Systems", Dickey et al; and copending application Ser. No. 07/566,214, filed Aug. 10, 1990, entitled "Cantilever Mount For Rotating Cylindrical Magnetrons", Stevenson et al; both applications are to be assigned to the intended assignee of the present application; and the entire disclosures of these two applications are hereby incorporated by reference. The rotating magnetrons may also be equipped with electron arc diverters available from Airco Coating Technologies, Inc., Fairfield, Calif.

The present invention has been described in terms of a number of embodiments. The invention however is not limited to the embodiments depicted and described. Rather the scope of the invention is defined by the appended claims.

What is claimed is:

1. A coating for an article, comprising:
    three layers, said layers being designated the first, second, and third layers, in numerical order, beginning with the layer furthest from the article;
    said first layer including a transparent material having a refractive index less than about 1.52 and having an optical thickness of about one quarter wavelength at a wavelength between about 480 and 560 nm;
    said second layer including a transparent material having a refractive index greater than the refractive index of said first layer and having an optical thickness less than the optical thickness of said first layer; and
    said third layer including a transition metal nitride and having a thickness between about 5 and 15 nm; and wherein
    said coating is electrically conductive and light attenuating, and has a photopic reflection less than about 0.25 percent.

2. The coating of claim 1 wherein said second layer has a refractive index between about 1.9 and 2.65.

3. The coating of claim 1 wherein said first layer includes silicon dioxide and said second layer includes titanium dioxide.

4. The coating of claim 1 wherein any of said layers of transparent material includes at least two sub-layers optically equivalent thereto.

5. The coating of claim 1 further including at least one adhesion layer between said first and second layers, and between said third layer and the article.

6. A coating for an article, comprising:
    four layers, said layers being designated the first, second, third, and fourth layers in numerical order, beginning with the layer farthest from the article;
    said first layer having a refractive index less than about 1.52 and having an optical thickness of about one-quarter wavelength at a wavelength between about 480 and 560 nm;
    said second layer having a refractive index greater than the refractive index of said first layer and having an optical thickness less than the optical thickness of said first layer;
    said third layer including a first transition metal nitride;
    said fourth layer including a second transition metal nitride; and
    said third and fourth layers having a combined thickness between about 5 and 15 nm; and wherein
    said coating is electrically conductive and light attenuating, and has a photopic reflection less than about 0.25 percent.

7. The coating of claim 6 wherein any one of said layers of transparent material includes at least two sub-layers.

8. A coating for an article, comprising:
    three layers, said layers being designated the first, second and third layers, in numerical order, beginning with the layer furthest from the article;
    said first layer including silicon dioxide and having a thickness of about 84.0 nanometers;
    said second layer including titanium dioxide and having a thickness of about 37.5 nanometers; and
    said third layer including niobium nitride and having a thickness of about 7.8 nanometers; and wherein
    said coating is electrically conductive and light attenuating, and has a photopic reflection less than about 0.25 percent.

9. A coated article, comprising:
    a substrate having on a surface thereof a coating including three layers;
    said layers being designated the first, second and third layers, in numerical order, beginning with the layer furthest from said substrate;
    said first layer having a refractive index less than about 1.52 and having an optical thickness of about one-quarter wavelength at a wavelength between about 480 and 560 nm;
    said second layer having a refractive index between about 1.9 and 2.65 and having an optical thickness less than the optical thickness of said first layer; and
    said third layer including a transition metal nitride and having a thickness between about 5 and 15 nm; and wherein
    said coating is electrically conductive and light attenuating, and has a photopic reflection less than about 0.25 percent.

10. The coated article of claim 9 further including an anti-reflection treatment on a second surface of said substrate.

11. The coated article of claim 10 wherein said antireflection treatment includes a layer of a transition metal nitride having an optical thickness between about 5 and 10 nm.

12. A coated article, comprising:
    a substrate having on a surface thereof a coating including four layers;
    said layers being designated the first, second, third, and fourth layers, in numerical order, beginning with the layer furthest from the substrate;
    said first layer having a refractive index less than about 1.52 and having an optical thickness of about one-quarter wavelength at a wavelength between about 480 and 560 nm;
    said second layer having a refractive index greater than the refractive index of said first layer and having an optical thickness less than the optical thickness of said first layer;

said third layer including a first transition metal nitride;

said fourth layer including a second transition metal nitride;

said third and fourth layers having a combined thickness between about 5 and 15 nm; and said first transition metal nitride having a refractive index (n) and an extinction coefficient (k) greater than about 2.0, and said second transition metal nitride having a refractive index (n) an extinction coefficient (k) less than about 2.0.

13. The article of claim 12 wherein said first layer includes silicon dioxide and has a thickness of about 84 nanometers; said second layer includes titanium dioxide and has a thickness of about 33 nanometers; said third layer includes niobium nitride and has a thickness of about 4.5 nanometers; and said fourth layer includes titanium nitride and has a thickness of about 6.7 nm.

14. The article of claim 12 further including an anti-reflection treatment on a second surface of said substrate.

15. The article of claim 14 wherein said anti-reflection treatment includes a layer of a transition metal nitride having a thickness between about 5 and 10 nm.

16. A coating for an article, comprising:

four layers, said layers being designated the first, second, third, and fourth layers in numerical order, beginning with the layer farthest from the article;

said first layer having a refractive index less than about 1.52 and having an optical thickness of about one-quarter wavelength at a wavelength between about 480 and 560 nanometers;

said second layer having a refractive index greater than the refractive index of said first layer and having an optical thickness less than the optical thickness of said first layer;

said third layer including a first transition metal nitride having a refractive index greater than about 2.0 and an extinction coefficient greater than about 2.0;

said fourth layer including a second transition metal nitride having a refractive index less than about 2.0 and an extinction coefficient less than about 2.0; and said third and fourth layers having a combined thickness between about 5 and 15 nanometers.

17. The coating of claim 16 wherein said second transition metal nitride is titanium nitride.

18. The coating of claim 17 wherein said first transition metal nitride is niobium nitride.

19. The coating of claim 18 wherein said first layer includes silicon dioxide.

20. The coating of claim 19 wherein said second layer includes titanium dioxide.

* * * * *

UNITED STATES PATENT AND TRADEMARK OFFICE
CERTIFICATE OF CORRECTION

PATENT NO. : 5,407,733
DATED : April 18, 1995
INVENTOR(S) : Erik J. Bjornard, Debra Steffenhagen, and R. Russel Austin It is certified that error appears in the above-indentified patent and that said Letters Patent is hereby corrected as shown below:

Column 5, line 67, delete "and transmission";
column 9, line 22, replace "tin/oxide" with --tin oxide--;
column 10, line 19, replace "FIG. 3" with --FIG. 4--;
column 10, line 20, replace "FIG. 4" with --FIG. 5--;
column 17, line 27, replace "1 percent" with --0.5 percent--

In the claims:
In claim 12, column 21, line 10, after "(n)", add --and--.

Signed and Sealed this

Ninth Day of July, 1996

Attest:

BRUCE LEHMAN

Attesting Officer    Commissioner of Patents and Trademarks